United States Patent
Saika

(10) Patent No.: US 8,447,944 B2
(45) Date of Patent: May 21, 2013

(54) INFORMATION PROCESSING DEVICE AND DATA SHREDDING METHOD

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 456 days.

(21) Appl. No.: 12/739,613

(22) PCT Filed: Apr. 9, 2010

(86) PCT No.: PCT/JP2010/002601
§ 371 (c)(1),
(2), (4) Date: Apr. 23, 2010

(87) PCT Pub. No.: WO2011/125132
PCT Pub. Date: Oct. 13, 2011

(65) Prior Publication Data
US 2012/0005453 A1    Jan. 5, 2012

(51) Int. Cl.
*G06F 12/00* (2006.01)
(52) U.S. Cl.
USPC .................. 711/165; 711/162; 711/E12.002; 711/E12.084; 711/E12.103
(58) Field of Classification Search ........................ None
See application file for complete search history.

(56) References Cited

U.S. PATENT DOCUMENTS

| | | | |
|---|---|---|---|
| 6,493,709 B1 * | 12/2002 | Aiken | 1/1 |
| 7,526,621 B2 * | 4/2009 | Stuart et al. | 711/159 |
| 7,539,813 B1 * | 5/2009 | Todd et al. | 711/108 |
| 7,596,674 B2 * | 9/2009 | Murase | 711/170 |
| 7,987,329 B2 * | 7/2011 | Kawamura et al. | 711/163 |
| 8,018,617 B2 * | 9/2011 | Kortenoeven et al. | 358/1.16 |
| 8,090,923 B2 * | 1/2012 | Kawamura | 711/170 |
| 8,195,874 B2 * | 6/2012 | Sato | 711/112 |

(Continued)

FOREIGN PATENT DOCUMENTS

| | | |
|---|---|---|
| EP | 2 141 616 A1 | 1/2010 |
| JP | 2009-064160 | 3/2009 |

OTHER PUBLICATIONS

International Search Report in International Application No. PCT/JP2010/002601 Jan. 4, 2011.

(Continued)

*Primary Examiner* — Edward Dudek, Jr.
*Assistant Examiner* — Christopher Birkhimer
(74) *Attorney, Agent, or Firm* — Brundidge & Stanger, P.C.

(57) ABSTRACT

An object is to enable efficient shredding of recording media in association with migration. An information processing device (a server device 3) receives a data input/output request in a unit of a file transmitted from a client device 2, and performs writing and reading of data to and from a storage system 10 having a recording medium (hard disk drive 171) in which a file entity specified in the received data input/output request is stored in units of data blocks. The information processing device is communicatively coupled to a different storage device which is a migration destination of data. In the case where after the migration of certain data, different data is written in a data block of the certain data in an overlapped manner, the data block is not shredded if the data block is already shredded related to either of the overlapped certain and the different data after the migration.

15 Claims, 49 Drawing Sheets

U.S. PATENT DOCUMENTS

| | | |
|---|---|---|
| 2006/0117136 A1 | 6/2006 | Tran et al. |
| 2006/0155944 A1* | 7/2006 | Kano ............................ 711/161 |
| 2007/0101054 A1* | 5/2007 | Sivathanu et al. ............ 711/112 |
| 2007/0300031 A1* | 12/2007 | Jevans et al. .................. 711/166 |
| 2008/0010326 A1 | 1/2008 | Carpenter et al. |
| 2009/0094228 A1* | 4/2009 | Bondurant et al. ............... 707/5 |
| 2009/0182930 A1 | 7/2009 | Taguchi et al. |

OTHER PUBLICATIONS

Written Opinion of the International Search Authority in International Application No. PCT/JP2010/002601 Jan. 4, 2011.

* cited by examiner

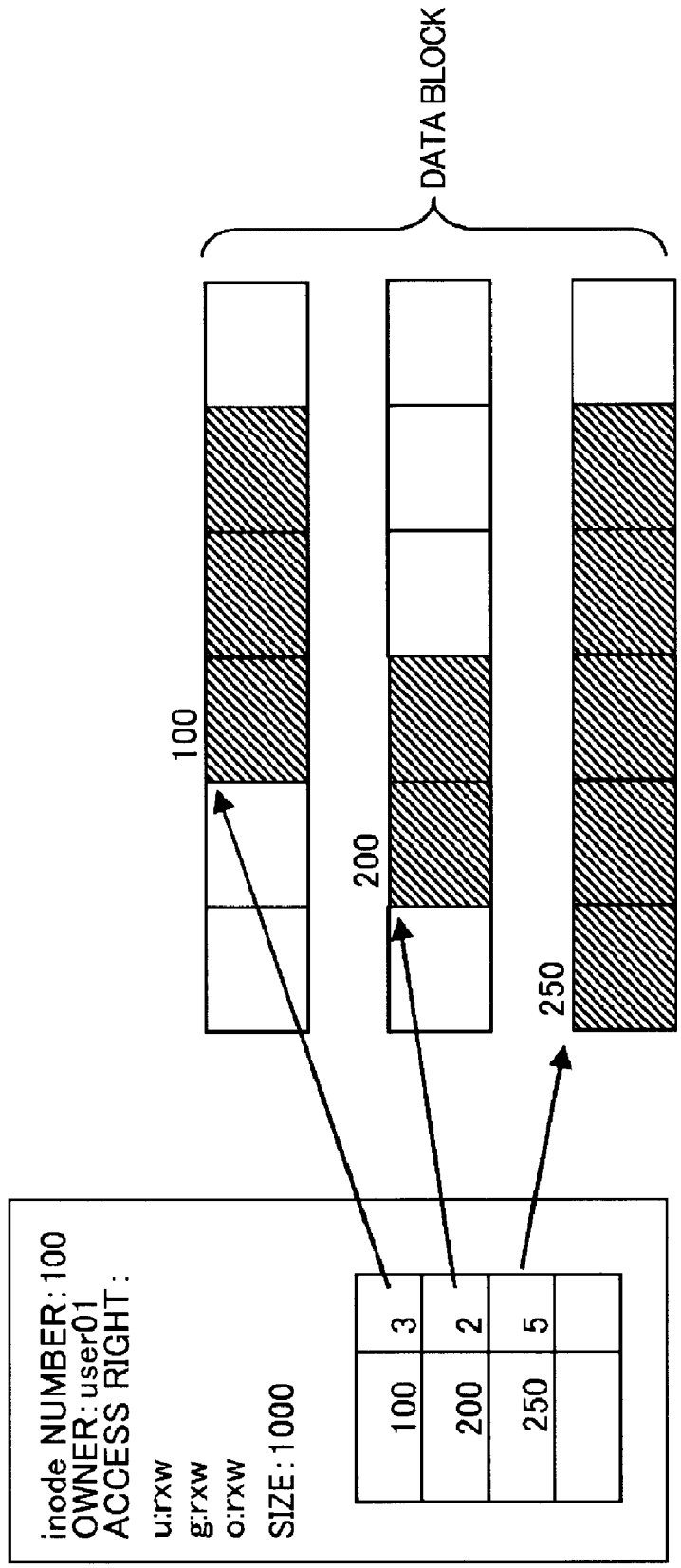

FIG. 11B inode MANAGEMENT TABLE 1012

| inode NUMBER | OWNER | ACCESS RIGHT | SIZE | DATA BLOCK ADDRESS 1 | | DATA BLOCK ADDRESS 2 | | DATA BLOCK ADDRESS 3 | | UPDATE (STORAGE) DATA/TIME | | TRANSITION TIME |
|---|---|---|---|---|---|---|---|---|---|---|---|---|
| | | | | BEFORE MIGRATION | AFTER MIGRATION | BEFORE MIGRATION | AFTER MIGRATION | BEFORE MIGRATION | AFTER MIGRATION | BEFORE MIGRATION | AFTER MIGRATION | |
| ... | ... | ... | ... | ... | ... | ... | ... | ... | ... | ... | ... | ... |
| 100 | user01 | u:g:o:rxw: rx:rxw | 100KB | 10-3 | 100-3 | 20-2 | 200-2 | 25-5 | 250-5 | 2010: 02: 10: 13: 05: 14 | 2010: 02: 15: 10: 25: 27 | 2010: 02: 13: 12: 04: 36 |
| ... | ... | ... | ... | ... | ... | ... | ... | ... | ... | ... | ... | ... |

10121　10122　10123　10124　10125A　10125B　10125A　10125B　10125A　10125B　10126A　10126B　10127

BLOCK STATE DEFINITIONS

| STATE IDENTIFIER | STATE NAME | DEFINITION |
|---|---|---|
| S0 | INITIAL STATE | STATE IN WHICH NO DATA IS STORED AFTER FILE SYSTEM CREATION OR SHREDDING |
| S1 | STORED STATE | STATE IN WHICH FIRST DATA IS STORED AFTER FILE SYSTEM CREATION OR SHREDDING FIRST DATA IS STORED AFTER FILE SYSTEM CREATION OR SHREDDING |
| S2 | NON-STORED STATE | STATE IN WHICH OTHER DATA IS STORABLE AFTER MIGRATION OF STORED DATA |
| S3 | OVERLAPPED-STORED STATE | STATE IN WHICH OTHER DATA IS STORED IN OVERLAPPED MANNER AFTER COMPLETION OF MIGRATION |
| S4 | OVERLAPPED-NON-STORED STATE | STATE IN WHICH OTHER DATA IS STORABLE IN OVERLAPPED MANNER AFTER MIGRATION OF STORED DATA IN STATE S3 |

FIG. 14

BLOCK STATE TRANSITION TABLE 922

| BEFORE-TRANSITION STATE \ AFTER-TRANSITION STATE | S0 | S1 | S2 | S3 | S4 |
|---|---|---|---|---|---|
| S0 | SHREDDING REQUEST | WRITE REQUEST | ✕ | ✕ | ✕ |
| S1 | SHREDDING REQUEST | WRITE REQUEST | MIGRATION REQUEST | ✕ | ✕ |
| S2 | SHREDDING REQUEST | ✕ | ✕ | WRITE REQUEST | ✕ |
| S3 | SHREDDING REQUEST | ✕ | ✕ | WRITE REQUEST | MIGRATION REQUEST |
| S4 | SHREDDING REQUEST | ✕ | ✕ | WRITE REQUEST | ✕ |

FIG. 17

FIG. 18 FLOW OF WRITE REQUEST PROCESSING

FIG. 21  FLOW OF MIGRATION REQUEST PROCESSING

FIG. 24 FLOW OF SHREDDING REQUEST PROCESSING

BLOCK STATE TRANSITION TABLE 922
(RELATIONSHIP BETWEEN ACCEPTED REQUEST AND PROCESSING TO BE PERFORMED)

| BEFORE-TRANSITION STATE \ AFTER-TRANSITION STATE | S0 | S1 | S2 | S3 | S4 |
|---|---|---|---|---|---|
| S0 | SHREDDING REQUEST / NOTHING | WRITE REQUEST / WRITE PROCESSING | ✕ | ✕ | ✕ |
| S1 | SHREDDING REQUEST / SHREDDING PROCESSING | WRITE REQUEST / WRITE PROCESSING | MIGRATION REQUEST / MIGRATION PROCESSING | ✕ | ✕ |
| S2 | SHREDDING REQUEST / SHREDDING PROCESSING | ✕ | ✕ | WRITE REQUEST / WRITE PROCESSING | ✕ |
| S3 | SHREDDING REQUEST / ·SAVING OF DATA ·SHREDDING PROCESSING ·RESET OVERLAP TIMES TO 0 | ✕ | ✕ | WRITE REQUEST / WRITE PROCESSING | MIGRATION REQUEST / MIGRATION PROCESSING |
| S4 | SHREDDING REQUEST / ·SHREDDING PROCESSING ·RESET OVERLAP TIMES TO 0 | ✕ | ✕ | WRITE REQUEST / ·WRITE PROCESSING ·INCREMENT OVERLAP TIMES | ✕ |

FIG. 27

SCHEMATIC DIAGRAM SHOWING STORING STATUS
OF FILE F2 (t=T2) AFTER FILE F1 MIGRATION

BLOCK STATE MANAGEMENT TABLE

| BLOCK ADDRESS | BLOCK STATE | OVERLAP TIMES |
|---|---|---|
| 0 | S1 → S2 | 0 |
| 1 | S1 → S2 → S3 | 0 → 1 |
| 2 | S1 → S2 → S3 | 0 → 1 |
| 3 | S0 → S1 | 0 |
| 4 | S0 → S1 | 0 |
| 5 | S0 | 0 |
| 6 | S0 | 0 |

9211  FILE F1 MIGRATION  9212  FILE F2 STORING  9213

SCHEMATIC DIAGRAM SHOWING SHREDDING STATUS OF FILE F1 (t=T3) AFTER FILE F2 MIGRATION

BLOCK STATE MANAGEMENT TABLE

| BLOCK ADDRESS (9211) | BLOCK STATE (9212) [MIGRATION / SHREDDING] | OVERLAP TIMES (9213) |
|---|---|---|
| 0 | S2→S0 | 0 |
| 1 | S3→S4→S0 | 1→0 |
| 2 | S3→S4→S0 | 1→0 |
| 3 | S1→S2 | 0 |
| 4 | S1→S2 | 0 |
| 5 | S0 | 0 |
| 6 | S0 | 0 |

SCHEMATIC DIAGRAM SHOWING STORING STATUS OF FILE F3 (t=T4)

BLOCK STATE MANAGEMENT TABLE

| BLOCK ADDRESS (9211) | BLOCK STATE (9212) | OVERLAP TIMES (9213) |
|---|---|---|
| 0 | S0 | 0 |
| 1 | S0 | 0 |
| 2 | S0 → S1 | 0 |
| 3 | S2 → S3 | 0 → 1 |
| 4 | S2 | 0 |
| 5 | S0 → S1 | 0 |
| 6 | S0 → S1 | 0 |

FILE F3 STORING

SCHEMATIC DIAGRAM SHOWING SHREDDING STATUS OF FILE F2 (t=T5) AFTER FILE F3 MIGRATION

BLOCK STATE MANAGEMENT TABLE 921

| BLOCK ADDRESS | BLOCK STATE | OVERLAP TIMES |
|---|---|---|
| 0 | S0 | 0 |
| 1 | S0 → → → S0 | 0 |
| 2 | S1 → S2 → S0 | 0 |
| 3 | S3 → S4 → S0 | 1 → 0 |
| 4 | S2 → → → S0 | 0 |
| 5 | S1 → S2 | 0 |
| 6 | S1 → S2 | 0 |

SCHEMATIC DIAGRAM SHOWING SHREDDING STATUS OF FILE F3 (t=T6)

BLOCK STATE MANAGEMENT TABLE 921

FILE F3 SHREDDING (SHREDDING FOR ADDRESSES 2, 3 IS OMITTED)

| BLOCK ADDRESS | BLOCK STATE | OVERLAP TIMES |
|---|---|---|
| 0 | S0 | 0 |
| 1 | S0 | 0 |
| 2 | S0 → S0 | 0 |
| 3 | S0 → S0 | 0 |
| 4 | S0 | 0 |
| 5 | S2 → S0 | 0 |
| 6 | S2 → S0 | 0 |

FILE F3 SHREDDING

BLOCK STATE DEFINITIONS (EXAMPLE 2)

| STATE IDENTIFIER | STATE NAME | DEFINITION |
|---|---|---|
| S0 | INITIAL STATE | STATE IN WHICH NO DATA IS STORED AFTER FILE SYSTEM CREATION OR SHREDDING |
| S1 | STORING STATE | STATE IN WHICH FIRST DATA IS STORED AFTER FILE SYSTEM CREATION OR SHREDDING |
| S2 | NON-STORED STATE | STATE IN WHICH OTHER DATA IS STORABLE AFTER MIGRATION OF STORED DATA |
| S3 | OVERLAPPED-STORED STATE | STATE IN WHICH OTHER DATA IS STORED IN OVERLAPPED MANNER AFTER COMPLETION OF MIGRATION |
| S4 | OVERLAPPED-NON-STORED STATE | STATE IN WHICH OTHER DATA IS STORABLE IN OVERLAPPED MANNER AFTER MIGRATION OF STORED DATA IN STATE S3 |
| S5 | SHREDDING PROCESSING ON-GOING STATE | STATE IN WHICH SHREDDING PROCESSING IS NOT COMPLETED (IN PROGRESS) |

FIG. 41

BLOCK STATE TRANSITION TABLE 922
(EXAMPLE 2)

| BEFORE TRANSITION \ AFTER TRANSITION | S0 | S1 | S2 | S3 | S4 | S5 |
|---|---|---|---|---|---|---|
| S0 | | WRITE REQUEST | | | | |
| S1 | SHREDDING REQUEST | WRITE REQUEST | MIGRATION REQUEST | | | |
| S2 | SHREDDING REQUEST | WRITE REQUEST | | WRITE REQUEST | | |
| S3 | SHREDDING REQUEST | | | WRITE REQUEST | MIGRATION REQUEST | SHREDDING REQUEST |
| S4 | | | | WRITE REQUEST | | SHREDDING REQUEST |
| S5 | PERCENTAGE OF COMPLETION 100% | | | | | SHREDDING REQUEST |

FIG. 44

BLOCK STATE TRANSITION TABLE 922 (EXAMPLE 2)
(RELATIONSHIP BETWEEN ACCEPTED REQUEST AND PROCESSING TO BE PERFORMED)

| BEFORE TRANSITION \ AFTER TRANSITION | S0 | S1 | S2 | S3 | S4 | S5 |
|---|---|---|---|---|---|---|
| S0 | SHREDDING REQUEST / NOTHING | WRITE REQUEST / WRITE PROCESSING | ✕ | ✕ | ✕ | ✕ |
| S1 | SHREDDING REQUEST / SHREDDING PROCESSING | WRITE REQUEST / WRITE PROCESSING | MIGRATION REQUEST / MIGRATION PROCESSING | ✕ | ✕ | ✕ |
| S2 | SHREDDING REQUEST / SHREDDING PROCESSING | ✕ | ✕ | WRITE REQUEST / ·WRITE PROCESSING ·SET OVERLAP TIMES TO 1 | ✕ | ✕ |
| S3 | ✕ | ✕ | ✕ | WRITE REQUEST / WRITE PROCESSING | MIGRATION REQUEST / MIGRATION PROCESSING | SHREDDING REQUEST / ·SHREDDING PROCESSING ·UPDATE PERCENTAGE OF COMPLETION |
| S4 | ✕ | ✕ | ✕ | WRITE REQUEST / ·WRITE PROCESSING ·INCREMENT OVERLAP TIMES | ✕ | SHREDDING REQUEST / ·SHREDDING PROCESSING ·UPDATE PERCENTAGE OF COMPLETION |
| S5 | PERCENTAGE OF COMPLETION 100% / ·RESET OVERLAP TIMES TO 0 ·RESET PERCENTAGE OF COMPLETION TO 0 | ✕ | ✕ | ✕ | ✕ | SHREDDING REQUEST / ·SHREDDING PROCESSING ·UPDATE PERCENTAGE OF COMPLETION |

FIG. 45

INFORMATION PROCESSING DEVICE AND DATA SHREDDING METHOD

TECHNICAL FIELD

The present invention relates to an information processing device and a data shredding method, and in particular to a technology to enable shredding of recording media efficiently.

BACKGROUND ART

In a recording device using magnetic recording media such as hard disk drives (hereinafter "HDDs") and the like, traces of data are left due to remaining magnetism even after the data is deleted in response to a file delete command or data block delete command prepared in and issued from an operating system (hereinafter "OS") or the like. Thus, the recording device has a possibility that a third party may read information from the recording device even after deletion of the information. In order to more reliably prevent a third party from stealing data and the like using remaining magnetism, a so-called shredding needs to be performed. In the shredding, data consisting of fixed values or random values is repeatedly written to the same storage area.

For example, consider a case where data is migrated to an archive device which is a read-only storage device from a file storage where data read/write is constantly executed by a computer such as a client device. Then, the data stored in the archive device is deleted upon expiration of the storage period of the data. At this time, shredding is performed on the data blocks of the file storage in which the data was stored before the migration.

Patent Literature (PTL) 1, for example, describes a technology of securely deleting data to be deleted in a remote copy environment including a first storage device and a second storage device. Specifically, when receiving a data delete request, the first storage device determines whether a volume to which data of a volume of the first storage device is copied exists in the second storage device. When determining that the volume exists, the first storage device also transmits a data delete request for the volume of the second storage device. Thus, the data is securely deleted.

CITATION LIST

Patent Literature

PTL 1: Japanese Patent Application Publication No. 2009-64160

SUMMARY OF INVENTION

Technical Problem

In the configuration described in PTL 1, each time the second storage device is found storing data corresponding to data in the first storage device that has received the data delete request, delete processing (shredding) of the data in the second storage device is performed. However, in an environment where data is migrated as needed from the constantly-used file storage to the archive device as in the above-mentioned example, it may happen that after one file is migrated from the file storage to the archive device, another file may be stored in an overlapped manner in the same data block in which the one file has been stored. In such a situation, when a shredding request is made for the above-mentioned two files stored in the archive device, the shredding is performed twice on the data block in the file storage where those two files are stored in the overlapped manner.

For shredding, data consisting of fixed values or random values needs to be written repeatedly in the same storage area as mentioned above. For this reason, the processing requires a considerable amount of time, and a large load is also placed on the server device and the storage system performing this processing. Particularly, in an environment where a large number of storage systems dealing with an enormous amount of data are operated, such as a data center operating an information processing system used by companies and the like for providing information processing services or used for operating Web services developed on the interne, targets to be shredded are so enormous that the time required for shredding and the processing load caused by shredding are problems. Accordingly, it is required to avoid an above-described redundant operation of shredding on the same data block.

The present invention has been made in view of the above-mentioned background, and a main object of the present invention is to provide an information processing device and a data shredding method capable of efficient shredding of recording media associated with data migration.

Solution to Problems

One aspect of this invention for achieving the above-mentioned object is to provide an information processing device that receives a data input/output request in a unit of a file, and performs writing and reading of data to and from a storage device having a recording medium in which a file entity specified in the received data input/output request is stored in units of data blocks, wherein the information processing device is communicatively coupled to a different storage device which is a migration destination of data included in a certain file stored in the recording medium, and in the case where the data included in the certain file is migrated to the different storage device, and other data included in a different file is then stored in an overlapped manner in the data blocks previously storing the migrated data, and when the information processing device receives a shredding request from the different storage device to shred the data blocks storing the different file, the information processing device determines whether the data blocks storing the different file contain a data block previously storing the data of the certain file and already shredded, and skips shredding of the data block determined as already shredded.

Other problems disclosed in this specification and solutions therefor will become clear in the following description of the preferred embodiments with reference to the accompanying drawings.

Advantageous Effects of Invention

According to the present invention, shredding of recording media associated with data migration can be performed efficiently, and security of data can be improved.

BRIEF DESCRIPTION OF DRAWINGS

FIG. 11A is a diagram explaining an inode.

FIG. 11B is a diagram explaining an inode management table 1012.

FIG. 14 is a table showing the definitions of the block statuses used in Example 1.

FIG. 17 is a setting example of a block status transition table 922 used in Example 1.

FIG. 27 is an example of the block status transition table 922 showing a relationship between an accepted processing request and the processing to be executed then.

FIG. 41 is a table showing the definitions of the block statuses used in Example 2.

FIG. 44 is a setting example of the block status transition table 922 used in Example 2.

FIG. 45 is an example of the block status transition table 922 of Example 2 showing a relationship between an accepted processing request and the processing to be executed then.

DESCRIPTION OF EMBODIMENTS

Figure 1:
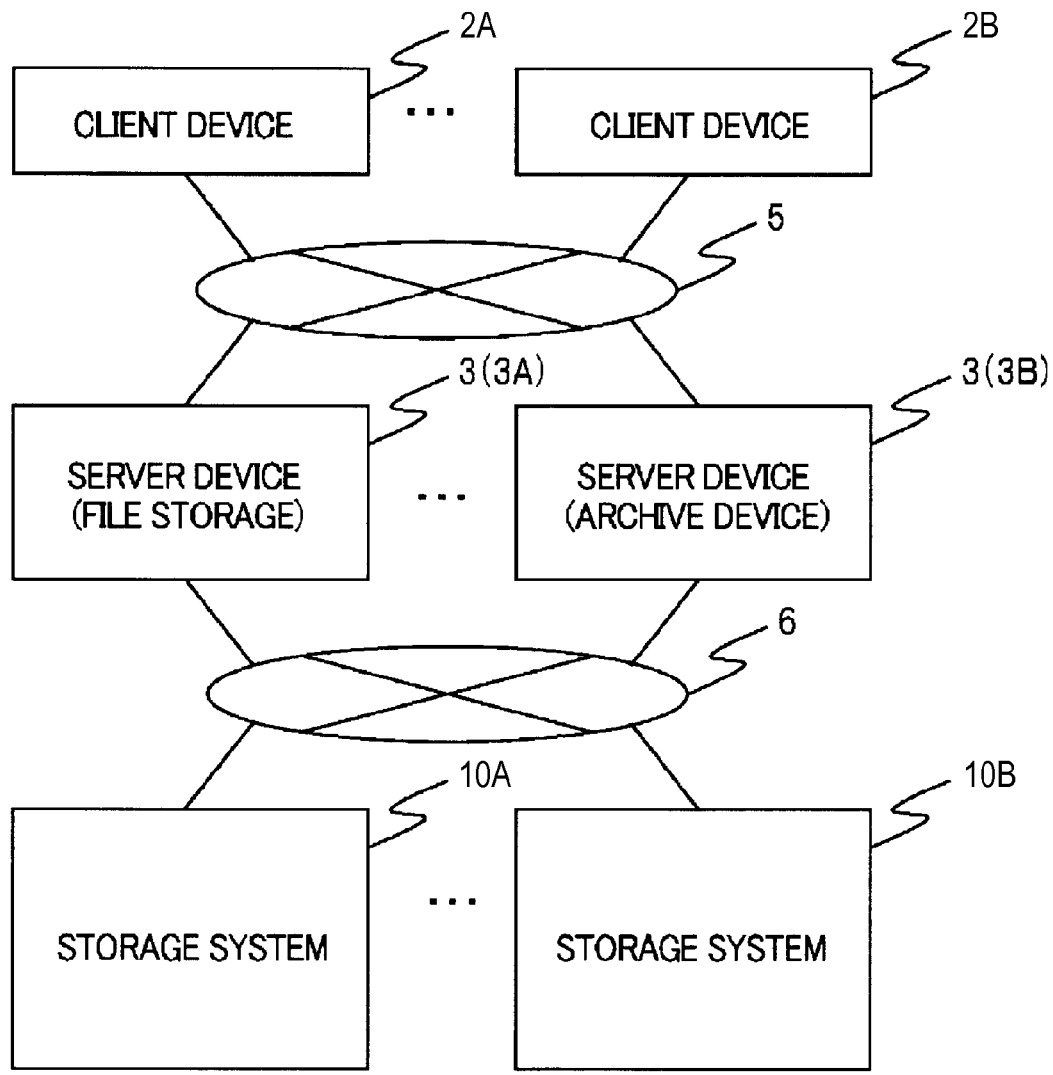
FIG. 1 shows a schematic configuration of an information processing system 1.

An embodiment is described below with the drawings. FIG. 1 shows a schematic configuration of an information processing system 1 described as an embodiment. As shown in the figure, the information processing system 1 is configured of one or more server devices 3, such as server devices 3A, 3B, one or more storage systems 10, such as storage systems 10A, 10B, and one or more client devices 2, such as client devices 2A, 2B. Among these, the client devices 2 and the server devices 3 are communicatively coupled via a communication network 5. The server devices 3 and the storage systems 10 are communicatively coupled via a storage network 6.

Note that in the Example, the server device 3 has a file storage 3A and an archive device 3B where the file storage 3A accepts a data write request and a data read request from the client device 2 to constantly perform data write and read processing, and the archive device 3B provides a storage area, i.e. a storage destination for the data migrated from the file storage 3A.

The communication network 5 is a LAN (Local Area Network), a WAN (Wide Area Network), the interne, a public line, a private line, and the like. The storage network 6 is a LAN (Local Area Network), a WAN (Wide Area Network), a SAN (Storage Area Network), the interne, a public line, a private line, and the like. Communication via the communication network 5 or the storage network 6 is performed in accordance with a protocol of, for example, TCP/IP, iSCSI (internet Small Computer System Interface), the Fibre Channel Protocol, FICON (Fibre Connection) (registered trademark), ESCON (Enterprise System Connection) (registered trademark), ACONARC (Advanced Connection Architecture) (registered trademark), FIB ARC (Fibre Connection Architecture) (registered trademark), and the like.

The client device 2 is an information processing device using a storage area provided by the storage system 10 via the server device 3, which is, for example, a personal computer, an office computer and the like. A file system, an Operating System achieved by executing a software module such as a kernel or a driver and the like, and various types of application and the like function in the client device 2.

Figure 2:
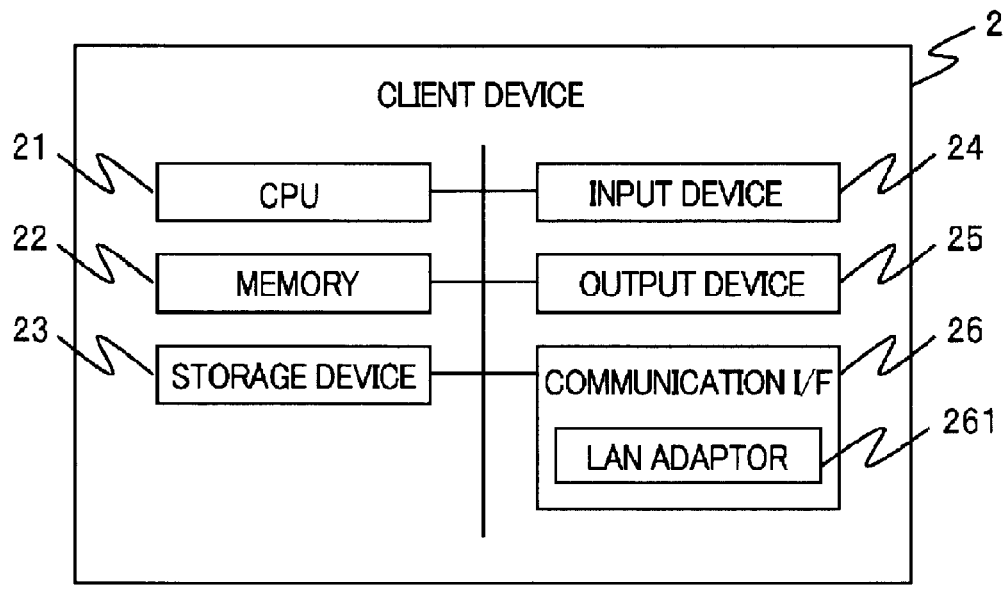
FIG. 2 is an example of a hardware configuration of a client device 2.

FIG. 2 shows an example of hardware of an information processing device (computer) which can be utilized as a client device 2. As shown in FIG. 2, this device includes a CPU 21, a volatile or non-volatile memory 22 (RAM or ROM), a storage device 23 (e.g. a hard disk drive or a semiconductor storage device (SSD (Solid State Drive)), an input device 24 such as a keyboard or a mouse, an output device 25 such as a liquid crystal display or a printer, a communication interface (hereinafter referred to as a communication I/F 26) such as an NIC (Network Interface Card) (hereinafter referred to as a LAN adapter 261), and a timer device 27 configured with a timer circuit or an RTC (Real Time Clock), and the like.

The server device 3 is an information processing device (computer) utilizing the storage area (data storage area) provided by the storage system 10. The server device 3 is configured with a personal computer, a mainframe, an office computer, and the like. The server device 3, for accessing the above-mentioned storage area, transmits a data frame (hereinafter abbreviated to a frame) including a data I/O request (data write request, data read request, and the like) to the storage system 10.

Figure 3:
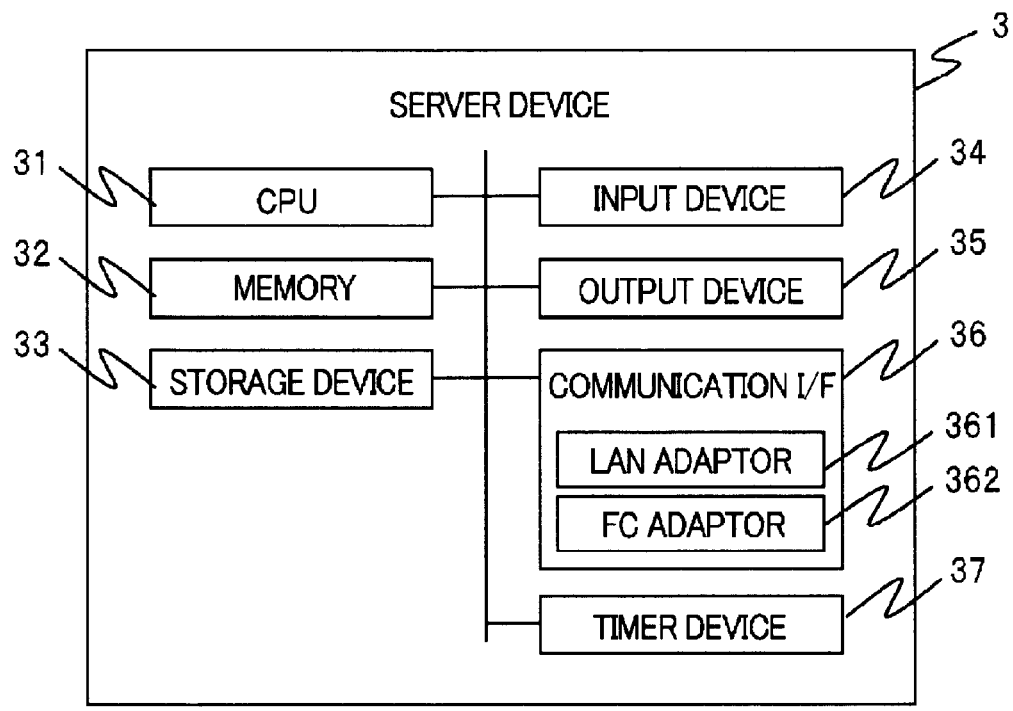
FIG. 3 is an example of a hardware configuration of a server device 3.

FIG. 3 shows an example of hardware of an information processing device (computer) which can be utilized as a server device 3. As shown in FIG. 3, this device includes a CPU 31, a volatile or non-volatile memory 32 (RAM or ROM), a storage device 33 (e.g. a hard disk drive or a semiconductor storage device (SSD)), an input device 34 such as a keyboard or a mouse, an output device 35 such as a liquid crystal display or a printer and the like, a communication interface (hereinafter referred to as a communication I/F 36) such as an NIC (hereinafter referred to as a LAN adapter 361) or an HBA (hereinafter referred to as an FC adapter 362), and a timer device 37 configured with a timer circuit, an RTC, and the like.

Figure 4:
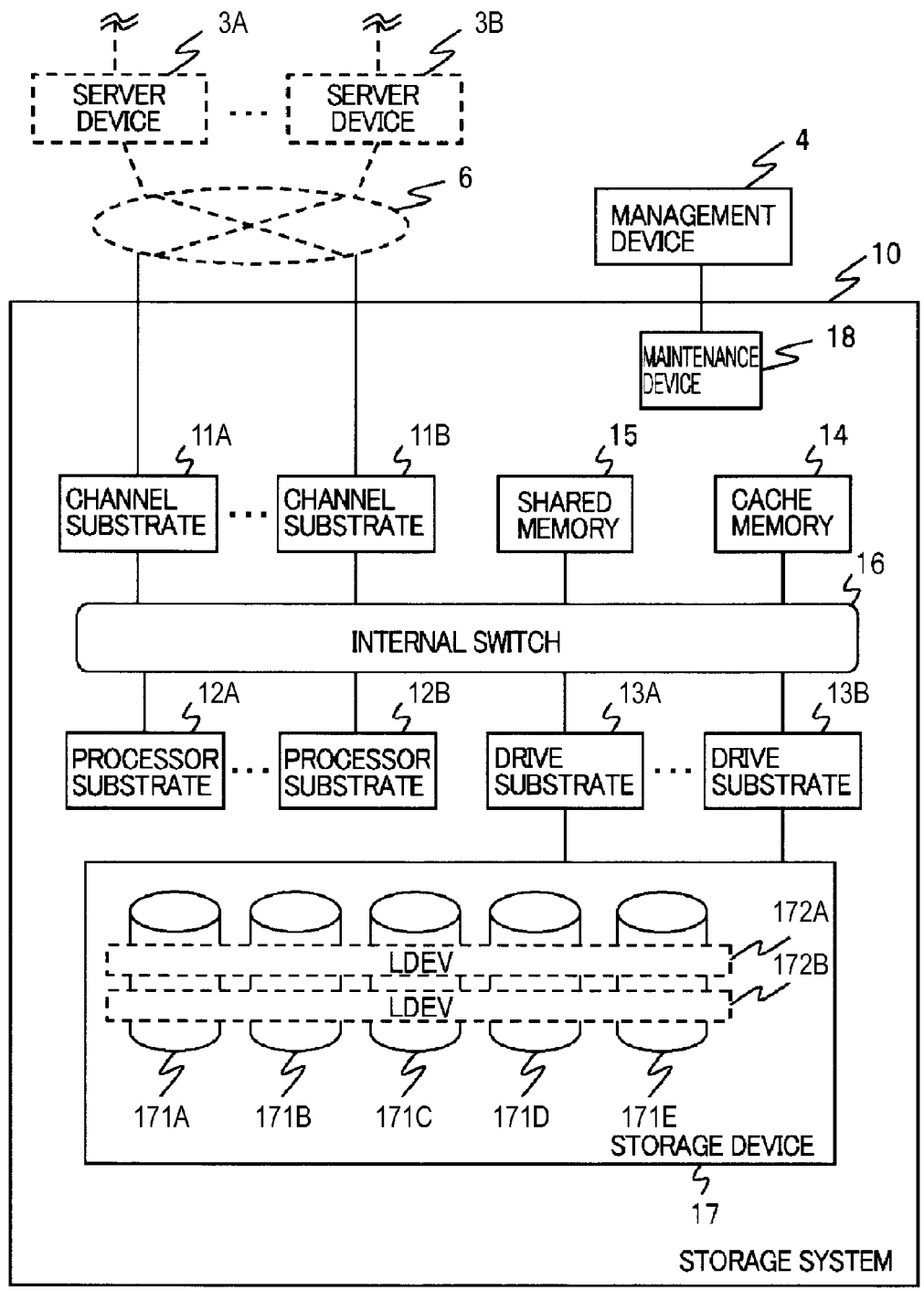
FIG. 4 is an example of a hardware configuration of a storage system 10.

FIG. 4 shows an example of the hardware configuration of the storage system 10. The storage system 10 is, for example, a disk array device. The storage system 10, in response to the above-mentioned I/O request transmitted from the server device 3, accesses a recording medium, and transmits data or a response to the server device 3. As shown in FIG. 4, this storage system 10 includes one or more channel substrates 11, such as channel substrates 11A, 11B, one or more processor substrates 12 (Micro Processors), such as processor substrates 12A, 12B, one or more drive substrates 13, such as drive substrates 13A, 13B, a Cache Memory 14, a Shared Memory 15, an internal switch 16, a storage device 17, and a maintenance device 18 (SVP: SerVice Processor). The channel substrates 11, the processor substrates 12, the drive substrates 13, the cache memory 14, and the shared memory 15, are communicatively coupled to one another via the internal switch 16.

The channel substrate 11 receives a frame transmitted from the server device 3, and transmits a frame including the response on the processing for the data I/O request included in the received frame (e.g. the data which was read, a read completion report, or a write completion report) to the server device 3. Note that the description below assumes the frame to be a Fibre Channel frame (FC frame).

The processor substrate 12, in response to the above-mentioned data I/O request included in the frame received by the channel substrate 11, performs processing relating to data transfer between the channel substrate 11, the drive substrate 13, and the cache memory 14. The processor substrate 12 passes data (data read from the storage device 17, data written to the storage device 17) between the channel substrate 11 and the drive substrate 13 performed via the cache memory 14, staging (reading data from the storage device 17) or destaging (writing data to the storage device 17) of data stored in the cache memory 14, and the like.

The cache memory 14 is configured with a RAM (Random Access Memory) capable of high-speed access. The cache memory 14 stores therein data to be written to the storage device 17 (hereinafter referred to as write data), data read from the storage device 17 (hereinafter referred to as read data) and the like. The shared memory 15 stores therein various types of information used for controlling the storage system 10.

The drive substrate 13 communicates with the storage device 17 when reading data from the storage device 17 and writing data to the storage device 17. The internal switch 16 is configured, for example, using a high-speed crossbar switch. Communication via the internal switch 16 is performed in accordance with a protocol such as a Fibre Channel protocol, iSCSI, TCP/IP, and the like.

The storage device 17 is configured to include a plurality of storage drives 171, such as storage drives 171A, 171B, 171C, 171D, 171E. The type of storage drives 171 are, for example, hard disk drives of SAS (Serial Attached SCSI), SATA (Serial ATA), FC (Fibre Channel), PATA (Parallel ATA), SCSI and the like or semiconductor storage devices (SSDs).

The storage device 17 provides a storage area in units of logical storage areas provided by controlling the storage drives 171 by methods of RAID (Redundant Array of Inexpensive (or Independent) Disks) and the like. This logical storage area is, for example, a logical device (LDEV 172, such as logical device 172A, 172B) configured with a RAID group (Parity Group). Meanwhile, the storage system 10 provides a logical storage area (hereinafter referred to as an LU (Logical Unit, a Logical Volume, or a logical volume) configured with LDEV s 172 to the server device 3. The storage system 10 manages the correspondence (relationship) between LUs and LDEVs 172 and, with reference to this correspondence, identifies the LDEVs 172 corresponding with the LUs or identifies the LUs corresponding to the LDEVs 172.

Figure 5A:
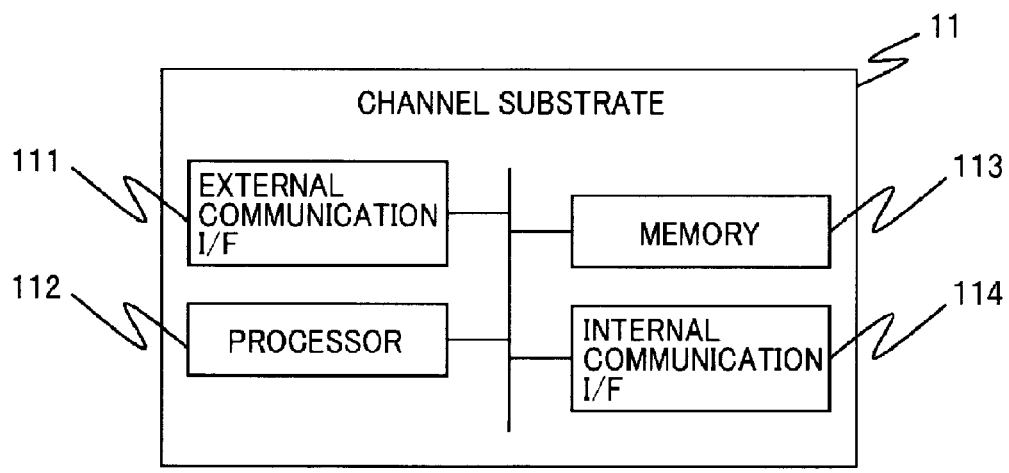
FIG. 5A is an example of a hardware configuration of a channel substrate 11.

FIG. 5A shows a hardware configuration of a channel substrate 11. As shown in FIG. 5A, the channel substrate 11 includes an external communication interface having a port (communication port) for communication with the server device 3 (hereinafter referred to as an external communication I/F 111), a processor 112 (including a frame processing chip and a frame transfer chip described later), a memory 113, an internal communication interface having a port (communication port) for communication with the processor substrate 12 (hereinafter referred to as an internal communication I/F 114).

The external communication I/F 111 is configured with an NIC (Network Interface Card), an HBA (Host Bus Adapter), and the like. The processor 112 is configured with a CPU (Central Processing Unit), an MPU (Micro Processing Unit), and the like. The memory 113 is a RAM (Random Access Memory) or a ROM (Read Only Memory). The memory 113 stores therein a microprogram. By the processor 112 reading the above-mentioned microprogram from the memory 113 and performing the same, various types of functions provided by the channel substrate 11 are implemented. The internal communication I/F 114 communicates with the processor substrate 12, the drive substrate 13, the cache memory 14, and the shared memory 15 via the internal switch 16.

Figure 5B:
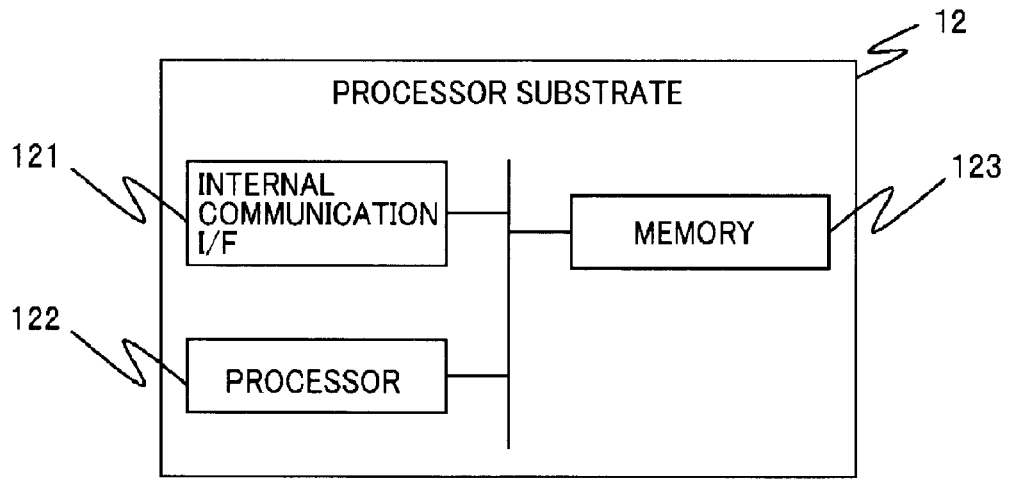
FIG. 5B is an example of a hardware configuration of a processor substrate 12.

FIG. 5B shows a hardware configuration of a processor substrate 12. The processor substrate 12 includes an internal communication interface (hereinafter referred to as internal communication I/F 121), a processor 122, and a memory 123 (local memory) with a higher performance in accessing from the processor 122 (i.e. capable of high-speed access) than the shared memory 15. The memory 123 stores therein a microprogram. By the processor 122 reading the above-mentioned microprogram from the memory 123 and executing the same, various functions provided by the processor substrate 12 are implemented.

The internal communication I/F 121 communicates with the channel substrate 11, the drive substrate 13, the cache memory 14, and the shared memory 15 via the internal switch 16. The processor 122 is configured using a CPU, an MPU, DMA (Direct Memory Access), and the like. The memory 123 is a RAM or a ROM. The processor 122 can access both the memory 123 and the shared memory 15.

Figure 5C:
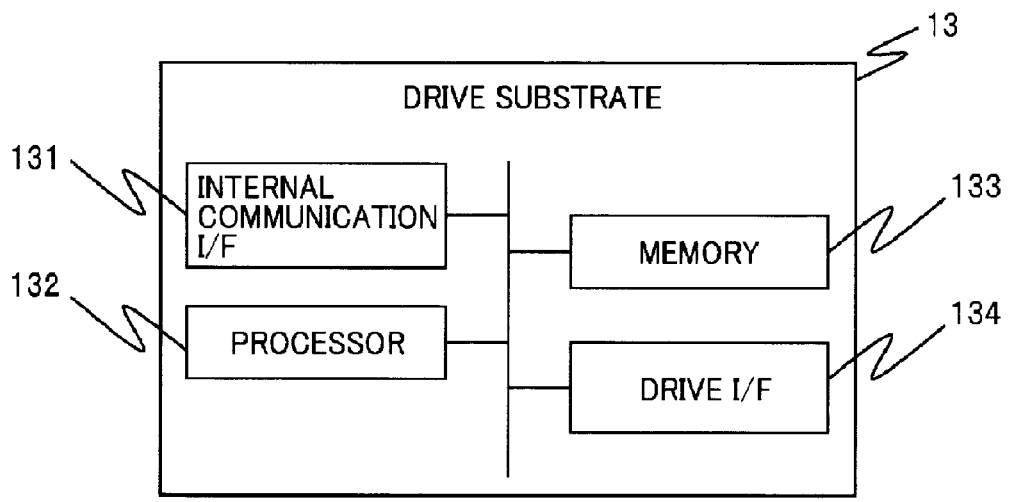
FIG. 5C is an example of a hardware configuration of a drive substrate 13.

FIG. 5C shows a hardware configuration of the drive substrate 13. The drive substrate 13 includes an internal communication interface (hereinafter referred to as an internal communication I/F 131), a processor 132, a memory 133, and a drive interface (hereinafter referred to as a drive I/F 134). The memory 133 stores therein a microprogram. By the processor 132 reading the above-mentioned microprogram from the memory 133 and executing the same, various functions provided by the drive substrate 13 are implemented. The internal communication I/F 131 communicates with the channel substrate 11, processor substrate 12, the cache memory 14, and the shared memory 15 via the internal switch 16. The processor 132 is configured using a CPU, an MPU, and the like. The memory 133 is, for example, a RAM or a ROM. The drive I/F 134 communicates with the storage device 17.

The maintenance device 18 shown in FIG. 4 controls and monitors the statuses of the components of the storage system 10. The maintenance device 18 is a personal computer, an office computer, and the like. The maintenance device 18, via the internal switch 16 or communication means such as LAN, communicates as needed with the components of the storage system 10 such as the channel substrate 11, the processor substrate 12, the drive substrate 13, the cache memory 14, the shared memory 15, and internal switch 16, to acquire operation information and the like from the components, and provides them to the management device 4. Furthermore, the maintenance device 18, sets, controls, and maintains the components (including installing and updating software) based on control information and operation information transmitted from the management device 4.

The management device 4 is a computer communicatively coupled to the maintenance device 18 via a LAN and the like. The management device 4 includes a user interface that uses a GUI (Graphic User Interface), CLI (Command Line Interface), and the like to control and monitor the storage system 10.

Figure 5D:
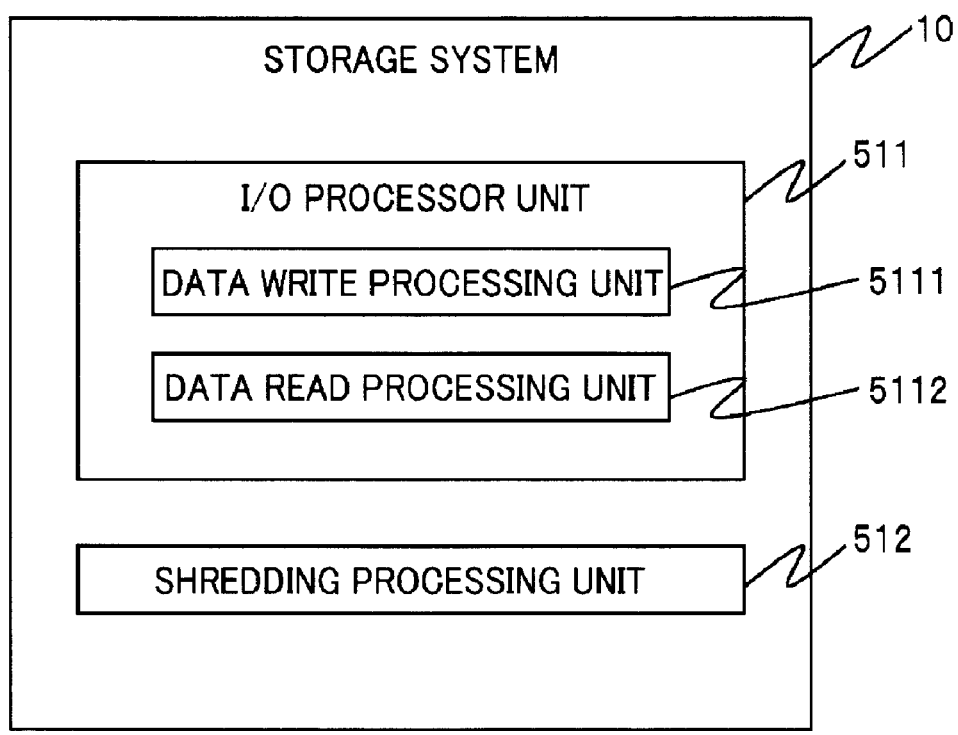
FIG. 5D is a diagram showing the main functions of the storage system 10.

FIG. 5D shows the main functions related to the services provided by the storage system 10 to the server device 3. As shown in FIG. 5D, the storage system 10 includes an I/O processing unit 511 and a shredding processing unit 512. The I/O processing unit 511 includes a data write processing unit 5111 that performs processing related to writing to the storage device 17 and a data read processing unit 5112 that performs processing related to reading of data from the storage device 17. The shredding processing unit 512, in accordance with shredding execution requests transmitted from the server device 3, performs shredding which is described later in units of data blocks.

Note that the functions of the I/O processing unit 511 and the shredding processing unit 512 are implemented by the hardware included in the channel substrate 11, the processor substrate 12, and the drive substrate 13 of the storage system 10, or by the processors 112, 122, and 132 reading and executing the microprograms stored in the memories 113, 123, and 133.

Figure 6:
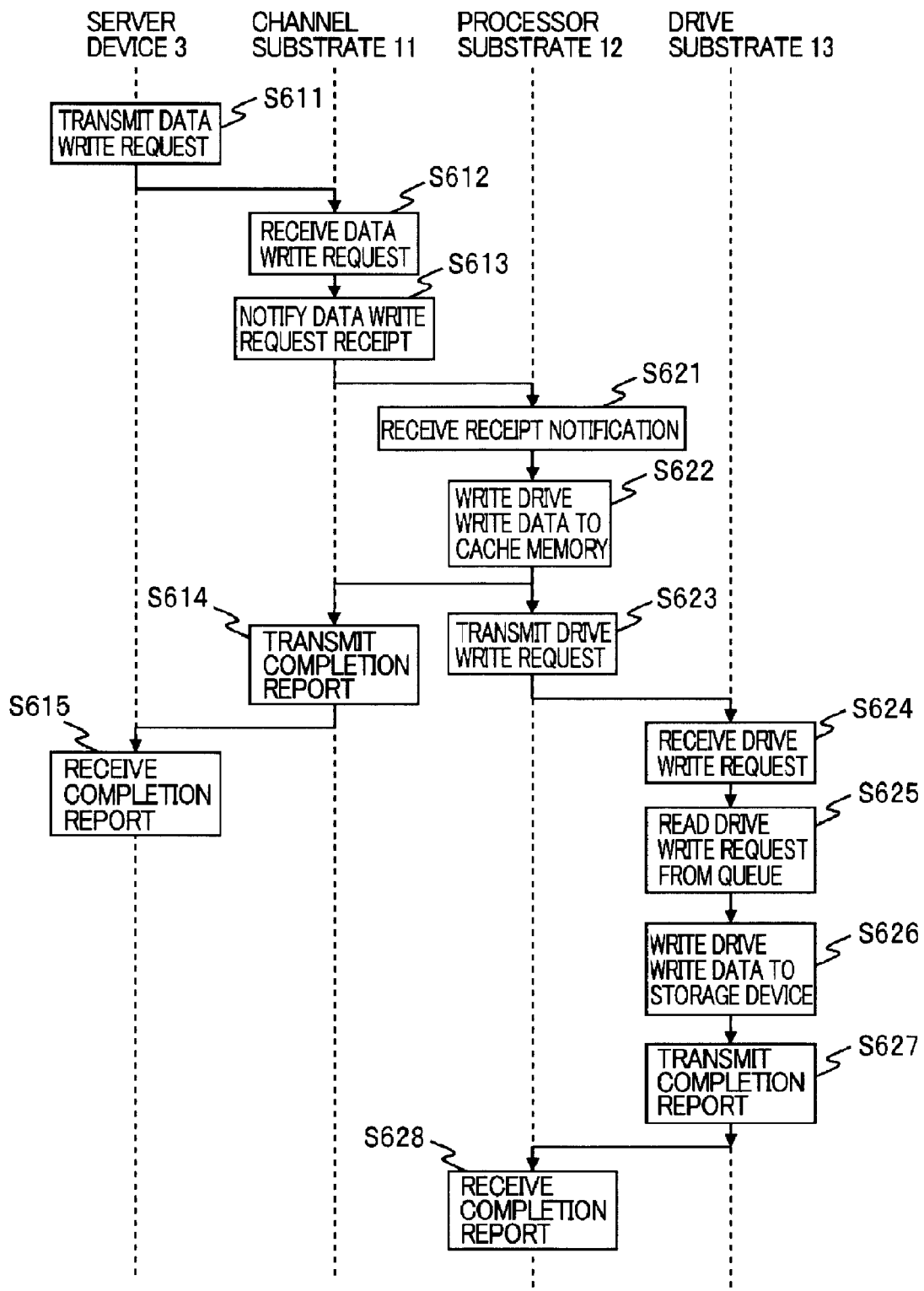
FIG. 6 is a flowchart explaining a data write processing 5600.

FIG. 6 is a flowchart explaining the processing performed by the data write processing unit 5111 of the I/O processing unit 511 in a case the storage system 10 receives a frame including a data write request from the server device 3 (hereinafter referred to as the data write processing S600). The data write processing S600 is described below with reference to FIG. 6. Note that, in the description below, the letter "S" prefixed to each reference numeral indicates "step."

The frame transmitted from the server device 3 is received by the channel substrate 11 in the storage system 10 (S611, S612). The channel substrate 11, when receiving the frame, notifies that to the processor substrate 12 and the drive substrate 13 (S613).

The processor substrate 12, when receiving the above-mentioned notification from the channel substrate 11 (S621), creates a drive write request based on the data write request of the relevant frame, and stores the created drive write request in the cache memory 14. Then, the processor substrate 12 transmits the created drive write request to the drive substrate 13 (S622, S623). The channel substrate 11 transmits a completion report to the server device 3 (S614), and the server device 3 receives the completion report (S615).

The drive substrate 13, when receiving the drive write request, registers the same to the write processing queue (S624). The drive substrate 13 reads the drive write request from the write processing queue as needed (S625). The drive substrate 13 reads the drive write data specified by the read drive write request from the cache memory 14, and writes the read drive write data to the storage drive 171 (S626).

Then the drive substrate 13 notifies the report (completion report) that, for the drive write request, the drive write data has been completed to the processor substrate 12 (S627), and the processor substrate 12 receives the transmitted completion report (S628).

Figure 7:
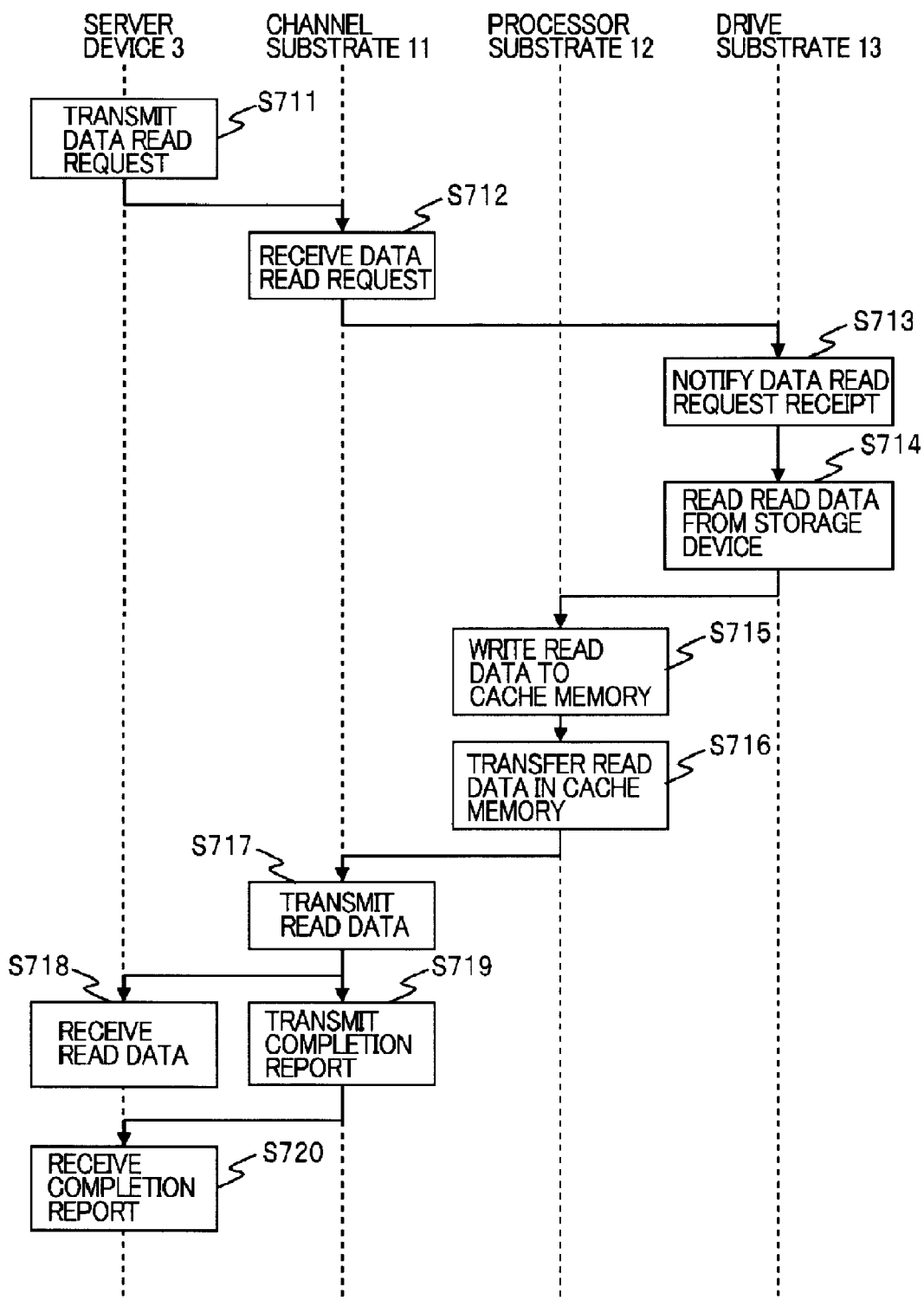
FIG. 7 is a flowchart explaining a data read processing 5700.

FIG. 7 is a flowchart explaining the I/O processing performed by the data read processing unit 5112 in the I/O processing unit 511 of the storage system 10 in a case the storage system 10 receives a frame including a data read request from the server device 3 (hereinafter referred to as the data read processing S700). The data read processing S700 is described below with reference to FIG. 7.

The frame transmitted from the server device 3 is received by the channel substrate 11 in the storage system 10 (S711, S712). The channel substrate 11, when receiving the frame from the server device 3, notifies that to the processor substrate 12 and the drive substrate 13 (S713).

The drive substrate 13, when receiving the above-mentioned notification from the channel substrate 11, reads the data specified by the data read request included in the relevant frame (e.g. specified by an LBA (Logical Block Address))

from the storage device 17 (storage drive 171) (S714). Note that, if there is any read data in the cache memory 14 (in a case of a cache hit), the read processing from the storage device 17 (S715) is omitted. The processor substrate 12 writes the data read by the drive substrate 13 to the cache memory 14 (S715). The processor substrate 12 transfers the data written to the cache memory 14 to the communication I/F as needed (S716).

The channel substrate 11 sequentially transmits the read data transmitted from the processor substrate 12 to the server device 3 (S717, S718). When the transmission of the read data is completed, the channel substrate 11 transmits a completion report to the server device 3 (S719), and the server device 3 receives the transmitted completion report (S720).

Next, the main functions of the client device 2, the server device 3, and the storage system 10 are described.

Figures 8A, 8B:
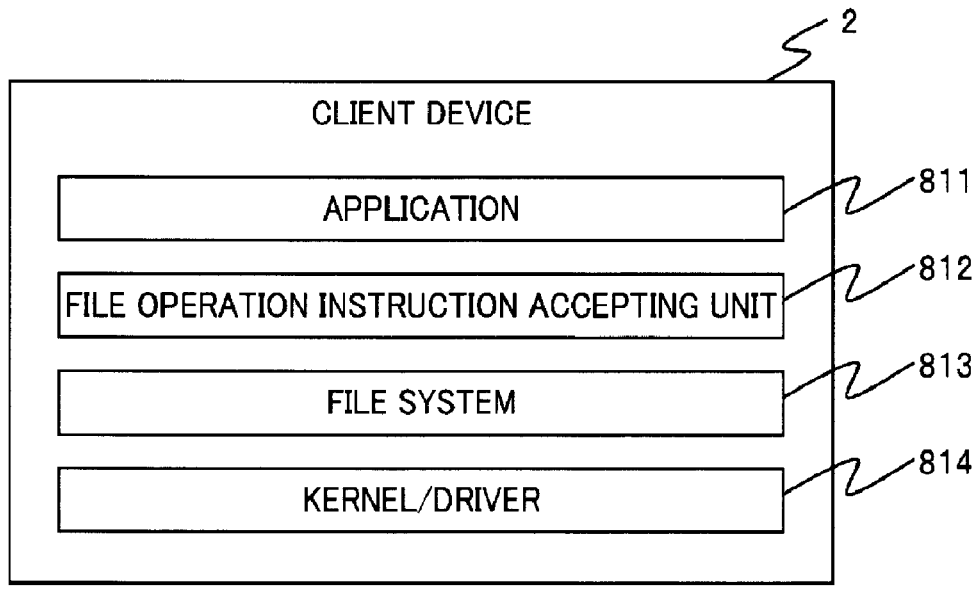
FIG. 8A is a diagram showing the main functions provided by the client device 2.
FIG. 8B is an example of a shredding request instruction screen 850.

FIG. 8A shows the main functions provided by the client device 2. As shown in FIG. 8A, the client device 2 provides functions of various applications 811, a file operation instruction accepting unit 812, a file system 813, and a kernel/driver 814. Note that these functions are carried out by the CPU 21 of the client device 2 reading and executing programs stored in the memory 22 and the storage device 23. On the other hand, the file system 813 and the kernel/driver 814 are implemented, for example, as the functions of the operating system installed in the client device 2.

In FIG. 8A, the applications 811 are implemented, for example, by the application software operating on the above-mentioned operating system. The file operation instruction accepting unit 812 accepts an instruction for file operations including migration and shredding in units of files from the user, and transmits the processing request corresponding with the accepted instruction to the server device 3. Here, shredding indicates the processing of physically writing data consisting of fixed values or random values once or more times to data blocks in the storage drives 171 configuring the storage device 17 in the storage system 10, for physically deleting traces that data had been stored. When the storage drive 171 is a hard disk drive, to completely delete traces of data (remaining magnetism), repeated writing data consisting of fixed values or random values is considered to be necessary.

The above-mentioned processing request includes at least information such as a file name or a file path name (identifier) (hereinafter referred to as a file path name) and the like for identifying the file to be the operation target file accepted by the file operation instruction accepting unit 812. FIG. 8B shows an example of the screen displayed when the file operation instruction accepting unit 812 accepts the operation instruction from a user (hereinafter referred to as a file operation instruction screen 850).

The file system 813 in FIG. 8A, for the client device 2, implements I/O functions for the logical volumes (LUs) in units of files or in units of directories. The file system 813 is, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, and the like.

The kernel/driver 814 is achieved by executing the kernel module or driver module configuring software of the operating system. Among these, the kernel module, for the software executed in the client device 2, includes programs for implementing fundamental functions included in the operating system such as process management, process scheduling, storage area management, and handling of interruption requests from the hardware. On the other hand, the driver module includes programs for hardware comprising the client device 2 and peripheral devices coupled to the client device 2 to communicate with the kernel module.

Figure 9A:
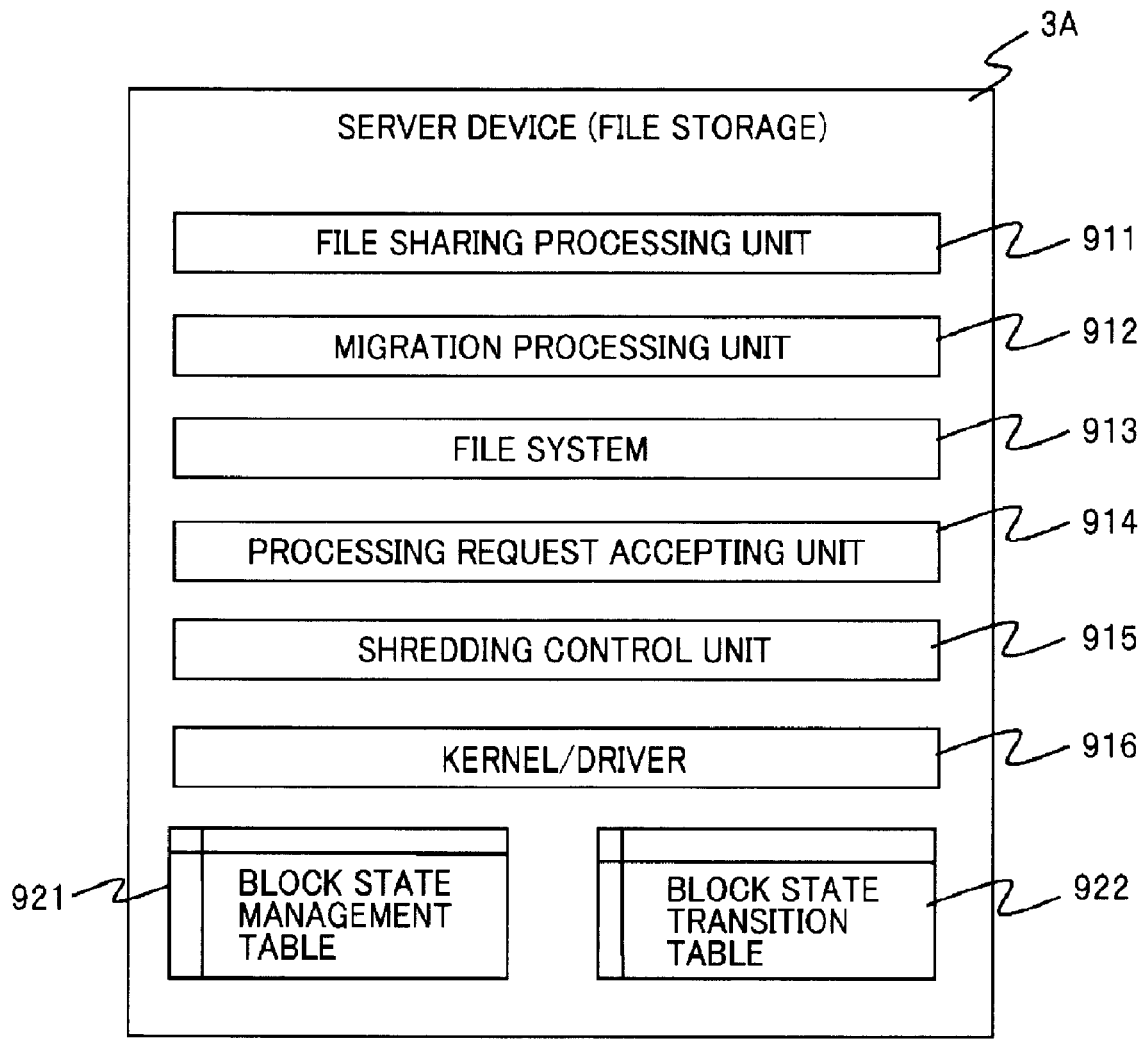
FIG. 9A is a diagram showing the main functions included in the server device 3A serving as a file storage and the tables managed in the server device 3A.
Figure 9B:
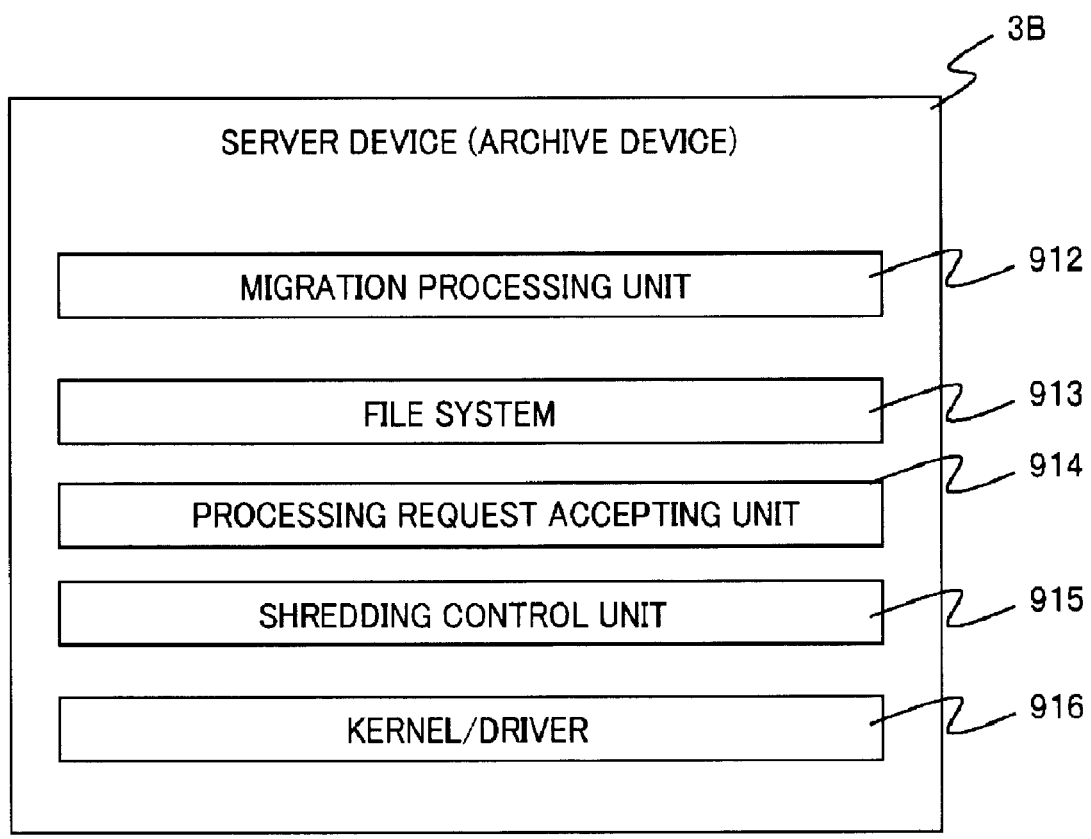
FIG. 9B is a diagram showing the main functions included in the server device 3B serving as an archive device and the table managed in the server device 3B.

FIGS. 9A and 9B show the main functions of the server device 3 and data (table) managed in the server device 3 as the file storage 3A and the archive device 3B, respectively. As shown in FIG. 9A, the server device 3 as the file storage 3A includes functions of a file sharing processing unit 911, a migration processing unit 912, a file system 913, a processing request accepting unit 914, a shredding control unit 915, and a kernel/driver 916. Note that the processing request accepting unit 914 and the shredding control unit 915 may be implemented as a function of the file system 913 or as a function independent of the file system 913. As shown in FIG. 9B, the server device 3 as the archive device 3B has the same configuration as that of the file storage 3A as described later except for the file sharing processing unit 911, the block status management table 921, and the block status transition table 922 that are not used in the archive device 3B.

Hereinbelow, the file storage 3A shown in FIG. 9A is described regarding the elements providing respective functions of the server device 3. In FIG. 9A, the file sharing processing unit 911 provides the environment for file sharing to the client device 2. The file sharing processing unit 911 is achieved by using the protocols of such as a network file system (distribution file system), for example, NFS (Network File System), CIFS (Common Internet File System), AFS (Andrew File System), and the like.

The migration processing unit 912 transmits a migration request received from the file operation instruction accepting unit 812 of the client device 2 via the processing request accepting unit 914 described later to the storage system 10.

The file system 913, using the logical volumes (LUs) provided by the storage system 10, provides I/O functions to the LUs in units of files or in units of directories for the client device 2. The file system 913 is, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, and the like.

The processing request accepting unit 914 accepts file operation requests transmitted from the client device 2. The processing request accepting unit 914 registers the accepted file operation requests to the processing queue, not shown, and processes the same sequentially.

The shredding control unit 915 transmits a shredding request received via the processing request accepting unit 914 to the shredding processing unit 512 of the storage system 10. At this point, the shredding control unit 915 provided in the file storage 3A performs shredding control according to the status of the data block in which the target file of the shredding request is stored. This is described later.

The kernel/driver 916 is achieved by executing the kernel module or driver module configuring the software of the operating system. The kernel module, for the software executed in the server device 3, includes programs for implementing the fundamental functions included in an operating system such as process management, process scheduling, storage area management, and handling of interruption requests from the hardware. The driver module includes programs for the hardware configuring the server device 3 and the peripheral devices coupled to the server device 3 to communicate with the kernel module.

As shown in FIG. 9A, the server device 3 as the file storage 3A manages data including the block status management table 921 and the block status transition table 922. These data are stored in and managed by, for example, the memory 32 or the storage device 33 of the server device 3. The block status management table 921 and the block status transition table 922 are provided for the migration processing unit 912, the processing request accepting unit 914, and the shredding control unit 915 to achieve the shredding control according to the present invention by referring to or updating the tables when performing migration, write, or shredding processing. An example of the configuration of each table and the content of the update processing are described later.

Figure 10:
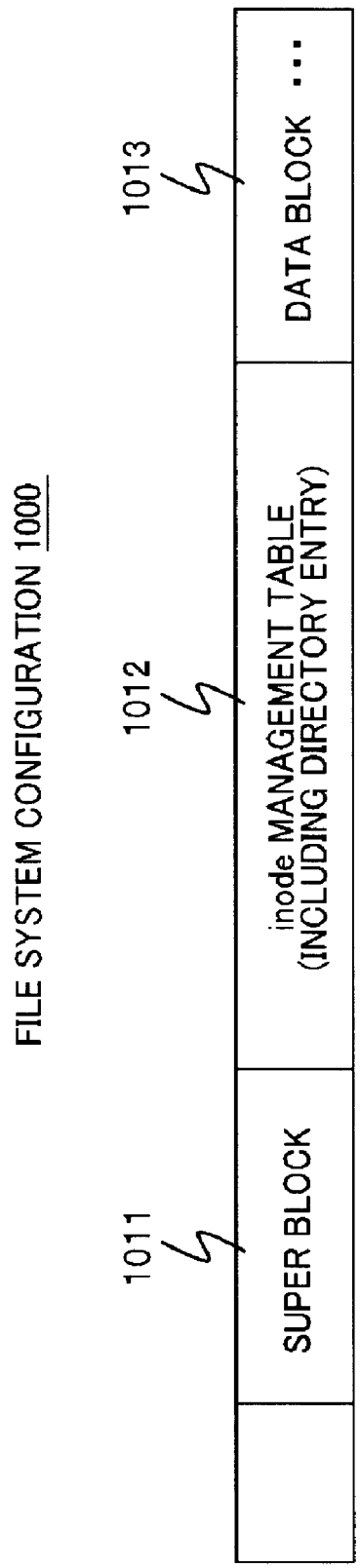
FIG. 10 is a diagram showing an example of a file system configuration 1000.

Next, the file management method by the file system 913 is described below. FIG. 10 is an example of the configuration of the data managed by the file system 912 in the logical volume (LU) (hereinafter referred to as a file system structure 1000). As shown in FIG. 10, this file system configuration 1000 includes respective storage areas of a super block 1011, an inode management table 1012, and a data block 1013 where the entity of the file (data) is stored.

Among these, the super block 1011 stores the information related to a partition set in the logical volume (LU). The super block 1011 is usually set for each disk partition. In the super block 1011, the number of data blocks in the partition, the block size, the number of free blocks, the number of free inodes, the number of times of mounting in the relevant partition, the elapsed time since the latest checking of consistency, and the like are stored.

Management information (hereinafter referred to as an inode) of the files stored in the logical volume (LU) are stored in the inode management table 1012. An inode is set for each file (one inode per file).

FIG. 11A and FIG. 11B show the concept of inodes. As shown in these figures, an inode includes an inode number 10121 which is the identifier for distinguishing each inode, an owner 10122 of the relevant file, an access right 10123 set to the relevant file, a file size 10124 of the relevant file, information for identifying the data block where the entity of the relevant file (data) is stored (hereinafter referred to as a block address 10125), information 10126 indicating an update date/time or a storage date/time of the relevant file, information 10127 indicating a transition time when the relevant file is migrated, and the like.

Relating to each block address 10125 and update (storage) date/time 10126, the information 10125A and 10126A before the migration and the information 10125B and 10126B after the migration are recorded in the inode management table 1012 in the file system 913 of the archive device 3B which is the file migration target. In the inode management table 1012 in the file system 913 of the file storage 3A which is the file migration source, each block address 10125 and the update (storage) date/time 10126 are not distinguished before and after the file migration, and the transition time 10127 is not recorded. Note that, for a given file, the metadata before the file migration is hereinafter referred to as "old metadata," and the metadata after the file migration is referred to as "new metadata."

Figure 12:
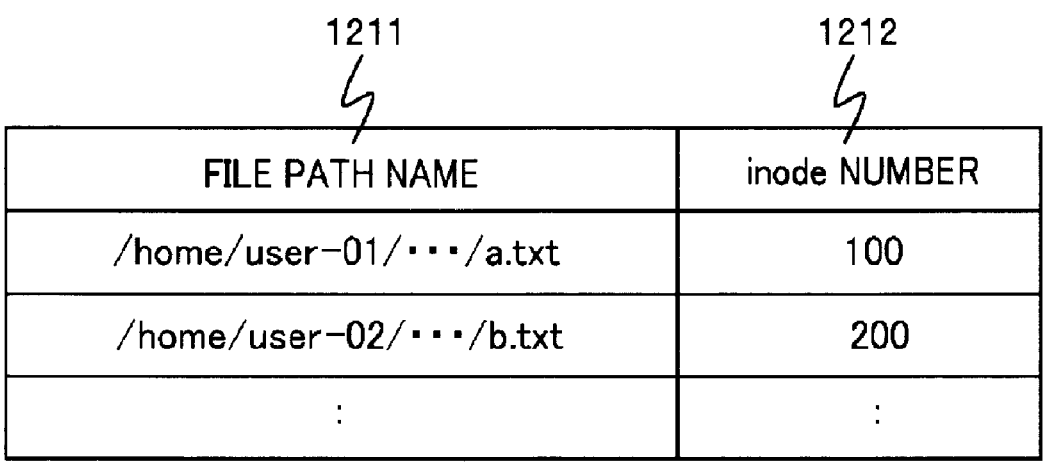
FIG. 12 is an example of a directory entry 1200.

The inode management table 1012 includes a directory entry 1200 (also referred to as a directory file). FIG. 12 shows an example of a directory entry 1200. As shown in the figure, the directory entry 1200 stores file path names 1211 and their respective corresponding inode numbers 1212. The file system 913, with reference to the directory entry 1200, identifies the inode numbers 1212 corresponding with the file path names 1211, and conversely identifies the file path names from the inode numbers 1212.

Next, a description is given of the content of data processing in the information processing system 1 of the Example.

Figure 13:
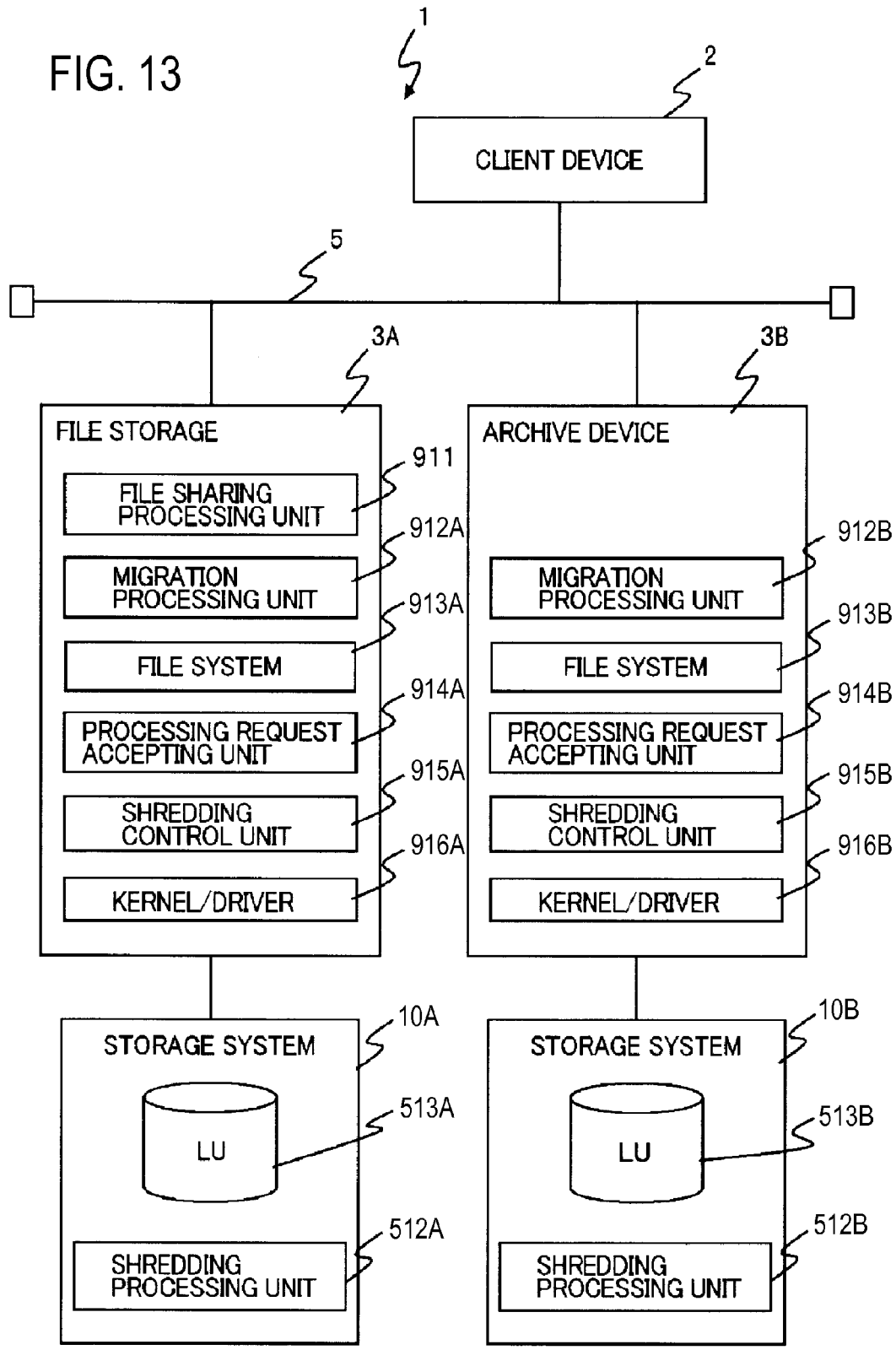
FIG. 13 is a schematic diagram showing a flow of data processing in the information processing system 1.

FIG. 13 shows a schematic diagram of the information processing system 1 to show a flow of data processing. The schematic diagram of FIG. 13 corresponds to the entire configuration diagram of FIG. 1, and includes the client device 2, the file storage 3A, the server device 3 as the archive device 3B, the storage system 10, such as storage systems 10A, 10B, and the communication network 5. As shown in FIG. 13, the server device 3 as the file storage 3A includes functions of a file sharing processing unit 911, a migration processing unit 912A, a file system 913A, a processing request accepting unit 914A, a shredding control unit 915A, and a kernel/driver 916A. The server device 3 as the archive device 3B includes a migration processing unit 912B, a file system 913B, a processing request accepting unit 914B, a shredding control unit 915B, and a kernel/driver 916B. Storage system 10A includes logical volume (LU) 513A and shredding processing unit 512A, and storage system 10B includes logical volume (LU) 513B and shredding processing unit 512B. Note that elements considered to be unnecessary for explaining the data flow are omitted to simplify the illustration. Hereinbelow, the data flow within the system 1 is described using FIG. 13.

Definitions for States of Data Storage Block Used in Example

Next, definitions for the states of the data storage block (hereinafter referred to as "block state definitions") used in the Example are described with reference to FIG. 14. FIG. 14 is a table showing the block state definitions used in Example 1.

In the Example, the migration processing unit 912, the processing request accepting unit 914, and the shredding control unit 915 are operated in the file storage 3A. The contents of processing performed by these units are determined by the states of the data blocks included in files which are targets of processing. The block state definitions, which are described later, are reflected on the block state management table 921 and the block state transition table 922 that are referred to by the migration processing unit 912, the processing request accepting unit 914, and the shredding control unit 915 when these units perform predetermined processing for the file. Then the block state definitions define the contents of processing performed by each of the above-mentioned units.

The states of the data blocks, which store the data included in the files, are classified into the following five types.

"Initial State" which is identified by a state identifier S0, and indicates a state of the data block, in which the data has not yet been stored after a file system creation or a shredding.

"Stored State" which is identified by a state identifier S1, and indicates a state of the data block, in which the data has been stored for the first time after a file system creation or a shredding (a state in which the data has been stored in the data block in an initial state for the first time).

"Non-Stored State" which is identified by a state identifier S2, and indicates a state of the data block, in which other data is storable after the migration of the data stored in the data block.

"Overlapped-Stored State" which is identified by a state identifier S3, and indicates a state of the data block, in which other data is stored without the data block being shredded after the migration is completed (in this specification, such a state of the data block is called an "overlapped-stored state").

"Overlapped-Non-Stored State" which is identified by a state identifier S4, and indicates a state of the data block, in which other data is storable again because the data stored in the data block in S3 state has been migrated (in this specification, such a state of the data block is called an "overlapped-non-stored state").

Figure 15:
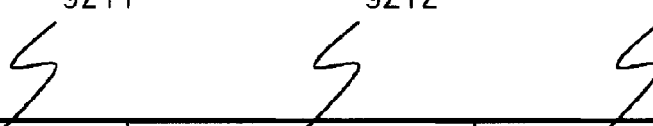
FIG. 15 is a setting example of a block status management table 921 of Example 1.

Next, a description is given of the block state management table 921, which has been mentioned in relation to the server device 3 as the file storage 3A. FIG. 15 shows a setting example of the block state management table 921 in the Example. The block state management table 921 records the block state of each data block in which file data is stored in the file storage 3A according to the above-mentioned block state definitions. During the file storage 3A operation, the block state is updated as needed by the migration processing unit 912, the processing request accepting unit 914, and the shredding control unit 915 in the file storage 3A.

The block state management table 921 records the following items: a block address 9211 indicating the address of the data block where the file data is stored, a block state 9212 identified by a state identifier indicating a block state, which is assigned to the block address 9211, and a number of overlap times 9213. The overlap times 9213 as overlap storing information is initialized to 0 upon an activation of the file storage 3A according to the block state definitions of FIG. 14, and is subsequently incremented for each data block when data storing processing is performed in a non-stored state (S2) or an overlapped-non-stored state (S4). The overlap times 9213 is reset to zero when shredding processing is performed on a data block for which one or more overlap times 9213 is recorded. Note that an overlap storing flag (for example, 1) indicating that a block address 9211 stores data in an overlapped manner may be recorded as overlap storing information, instead of the overlap times 9213.

Figure 16:
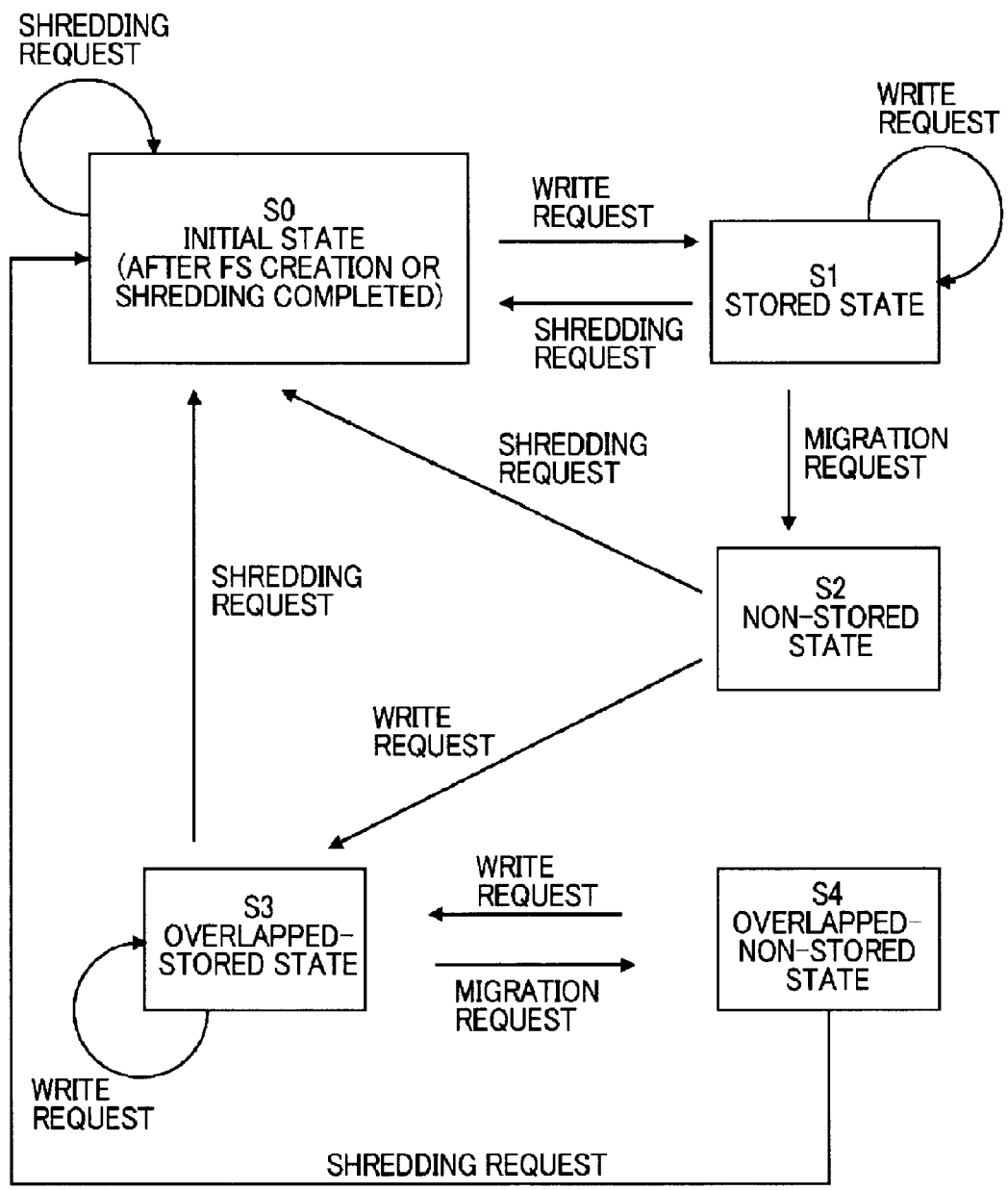
FIG. 16 is a schematic diagram explaining a block status transition in Example 1.

Next, transitions of the block states of each data block in the file storage 3A and a setting example of the block state transition table 922 which summarizes the transitions. FIG. 16 shows an explanatory diagram explaining the transitions of the block states in the Example. FIG. 17 shows a setting example of the block state transition table 922.

The explanatory diagram of FIG. 16 schematically shows how data block states make transitions when processing of data write, migration, and shredding are performed on the data block identified by each of the state identifiers S0-S4. In FIG. 16, each rectangle figure shows a state of the data block, and each arrow connecting two rectangle figures, accompanied with explanatory words shows the content of request to be processed to the data block. For example, in FIG. 16, a shredding request to the data block in the state S0 does not make a transition because data has not yet been stored in the data block after a file is created or shredding is processed. On the other hand, a write request to the data block in the state S0 makes a transition of the state of the data block to the state S1 because new data is stored therein.

The block state transition table 922 illustrated in FIG. 17 summarizes in a table format the respective states of the data block shown by the schematic explanatory diagram of FIG. 16 and the states after state transition caused by processing requests performed on the data block so that the table can be referred to by the migration processing unit 912, the processing request accepting unit 914, and the shredding control unit 915 of the file storage 3A. The block state transition table 922 is held in the storage device 33 and the like of the file storage 3A as described above.

More specifically, before-transition states indicating the states before the transition due to specific processing are shown in the column direction of the block state transition table 922, and after-transition states indicating the states after the transition are shown in the row direction. For example, by referring to the block state transition table 922 of FIG. 17, one can obtain the information that when a "write request" is processed to a data block in the state S2 (non-stored state), the state of the data block makes a transition to the state S3 (overlapped-stored state).

Next, the flow of data processing in the Example is specifically illustrated based on the schematic diagrams of FIG. 13 and FIG. 16, and the setting example of the block state management table 921.

Processing of Write Request

Figure 18:
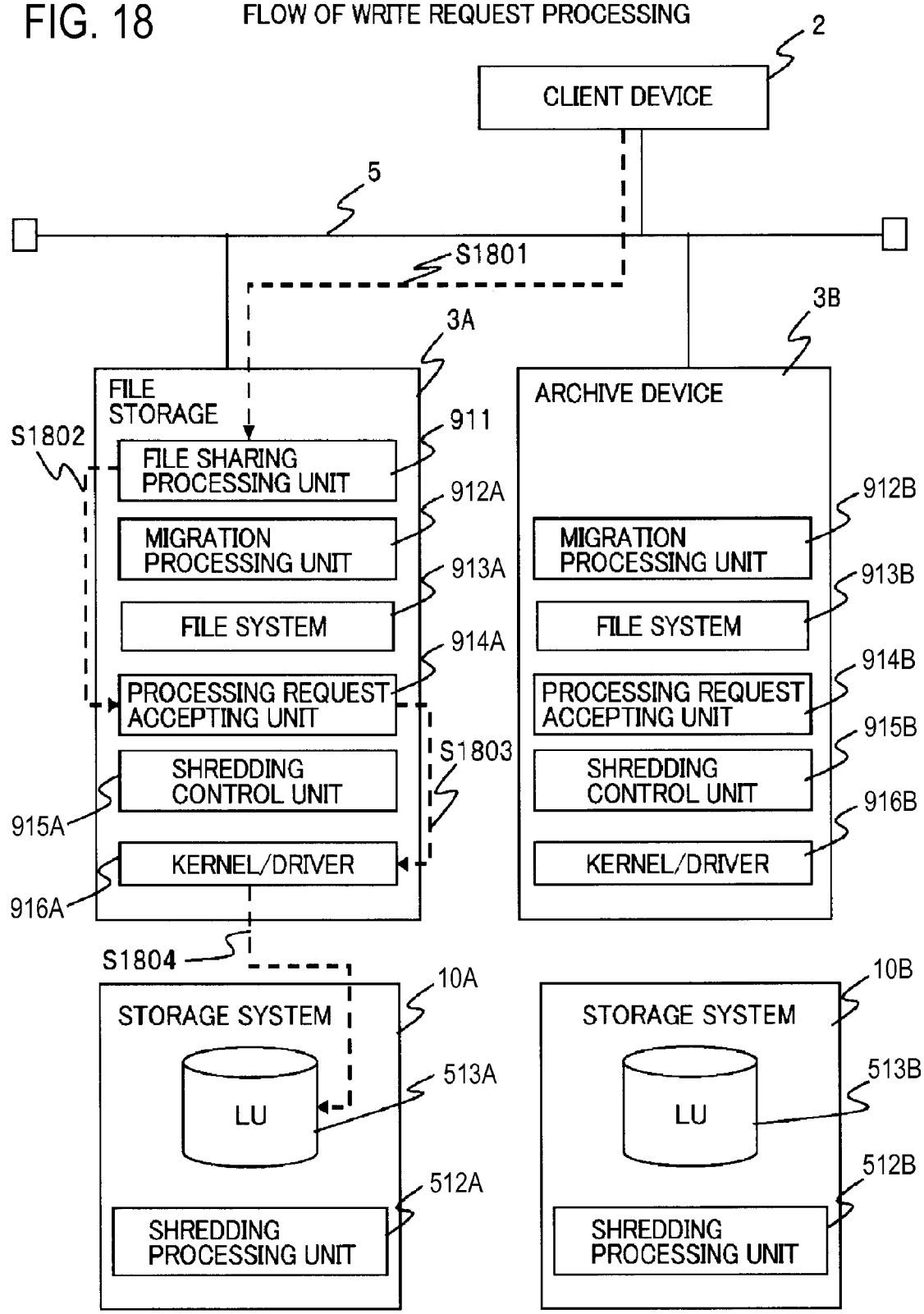
FIG. 18 is a schematic diagram showing a flow of a write request processing.

In FIG. 18, a description is given of processing of a write request in the information processing system 1 of the Example. In the figure, each broken line arrow indicates a data flow, so as in the corresponding figures below. As shown in FIG. 18, the write request in units of files is made from a client device 2 (S1801) to the file sharing processing unit 911 of file storage 3A, and then the file sharing processing unit 911 forwards the write request to the processing request accepting unit 914A (S1802). In the case of the Example, the archive device 3B only performs write processing associated with migration processing from the file storage 3A, and does not directly receive a write request from the client device 2. Note that the letter "S" indicates "step."

Then the processing request accepting unit 914A performs write processing of the data block corresponding to the write request to the storage system 10 via the kernel/driver 916A (S1803, S1804) by referring to the inode management table 1012 of the file system 913A. The processing request accepting unit 914A also acquires the block state of the target data block of the write request from the block state management table 921, and then refers to the block state transition table 922 to acquire the block state after the transition according to the write request processing for each data block. The processing 18 request accepting unit 914A updates the content of the block state management table 921 according to the acquired information.

Figure 19:
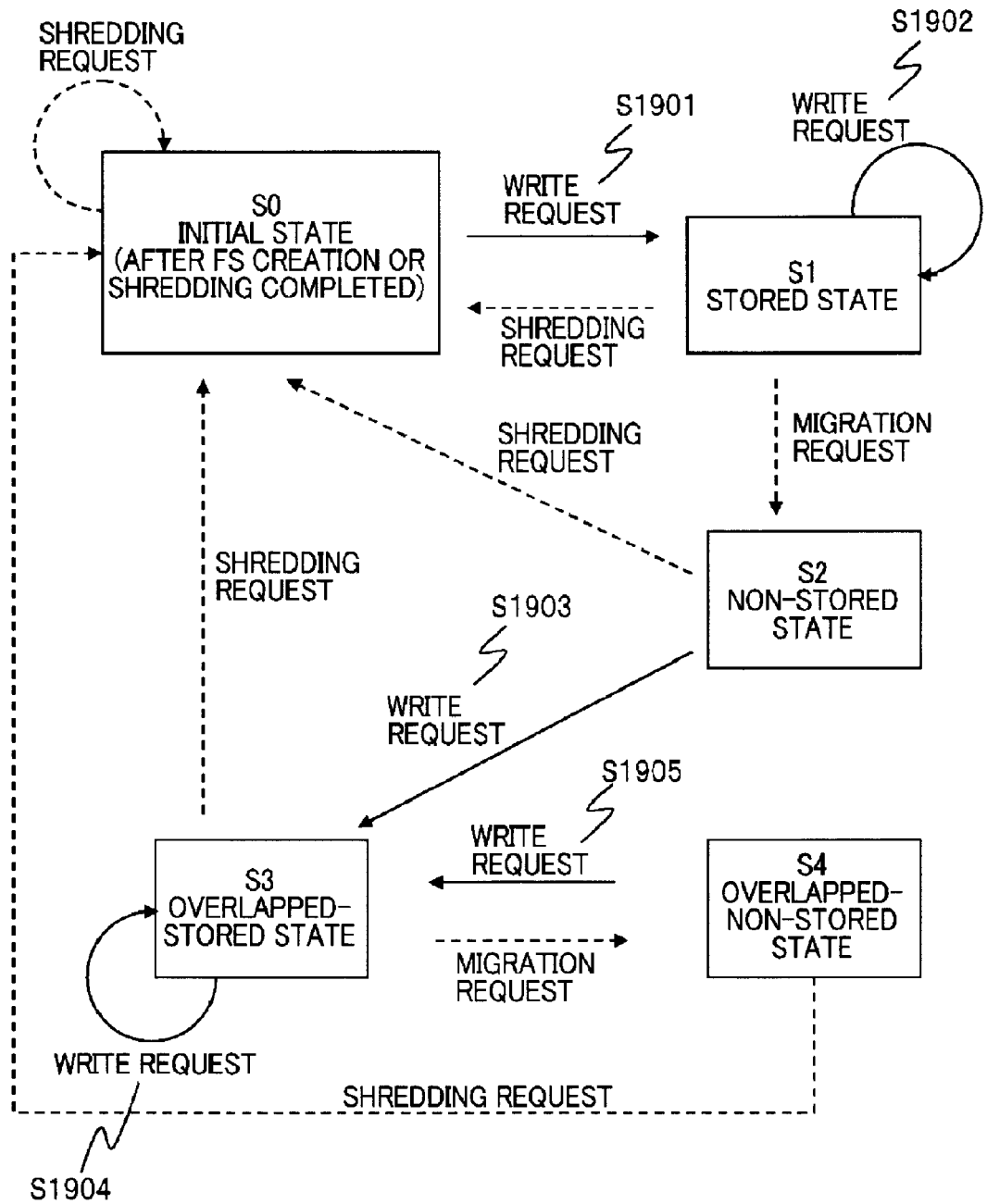
FIG. 19 is a schematic diagram explaining a block status transition when a write request is accepted.

FIG. 19 shows a schematic explanatory diagram of the block state transition at the time of the above-mentioned write request processing. In the figure, each solid line arrow indicates a state transition at the time of the write request processing to the data block. As mentioned above, the state of the data block after the write processing differs according to the state of the data block in which data is written. The state of the data block makes a transition from the state S0 to the state S1 (S1901) when data is written in the data block for the first time after a file system is created or shredding is completed. Additional data write processing to the data block in the state S1 is just an update processing of the data stored in step S1901. Thus, the state remains the same as before (S1902).

When a write request is processed to the data block in the state S2, data is written in a portion whose state is in a non-stored state due to a migration, and the data block is in the overlapped-stored state S3 (S1903). When a write request is processed to the data block in the state S3, the data stored in step S1903 is updated, and thus the state remains the same as before (S1904). When a write request is processed to the data block in the state S4, migration is performed on the data block whose state is in an overlapped-stored state due to S1903. As a result, the data block is in the overlapped-non-stored state. After that data is additionally written in the data block, so that the data block is in the overlapped-stored state again (S1905).

Figure 20:
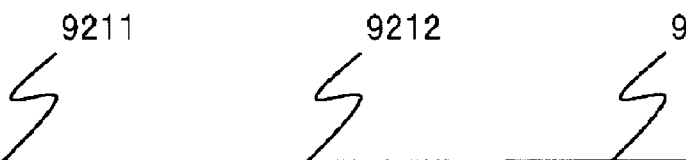
FIG. 20 is a diagram showing an update process of the block status management table 921 when a write request is received.

FIG. 20 shows an update example of the block state management table 921 at the time of the write request processing described above. In the case that the after-transition state is S0, S1, or S2, the overlap times 9213 is recorded as 0 times for the block addresses 0, 2, and 3 because an overlap does not occur due to the definitions of the block state transition table 922. At the block address 1, its state makes a transition from the non-stored state S2 to the overlapped-stored state S3 due to data write, and thus the overlap times 9213 is incremented and 1 is recorded therein. As shown at the block address 4, when migration and data write are repeated on the same data block, the state thereof makes an alternating transition between the overlapped-stored state S3 and the overlapped-non-stored state S4. Thereby, the overlap times 9213 is incremented.

Processing of Migration Request

Figure 21:
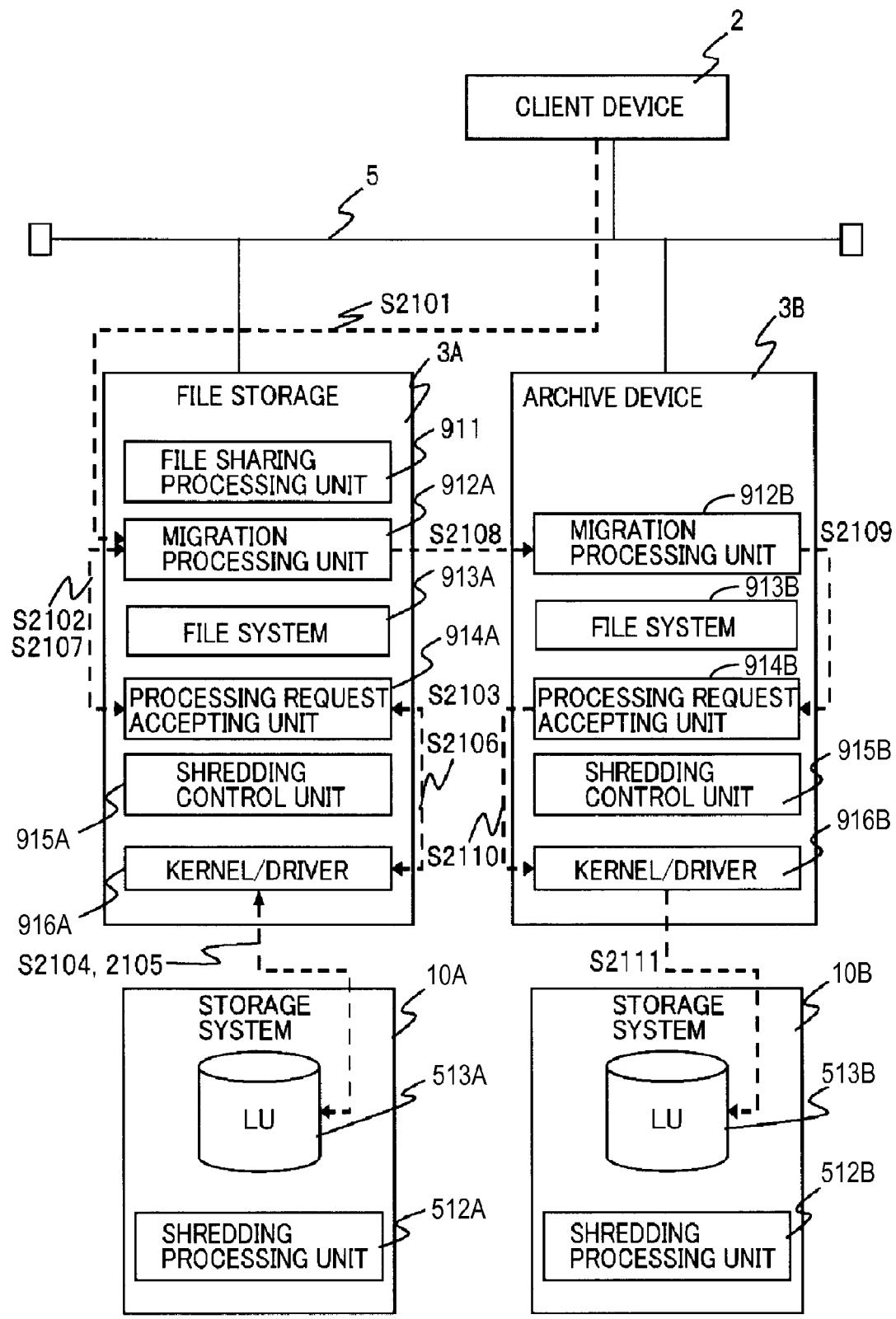
FIG. 21 is a schematic diagram showing a flow of a migration request processing.

In FIG. 21, a description is given of processing of a migration request in the information processing system 1 of the Example. First, the migration processing unit 912A of the file storage 3A accepts a migration request from the client device 2 (S2101). The migration processing unit 912A requests data related to one or more files included in the migration request to the processing request accepting unit 914A (S2102). The processing request accepting unit 914A refers to the inode management table 1012 of the file system 913A to acquire the file data associated with the migration request via the kernel/driver 916A from the logical volume (LU) 513A of the storage system 10A, and forwards the file data to the migration processing unit 912A (S2103 to S2107).

The processing request accepting unit 914A acquires the block state of the target data block of the migration request from the block state management table 921 to refer to the block state transition table 922, and then acquires the block state after the transition made by the migration request processing for each data block. The processing request accepting unit 914A updates the content of the block state management table 921 according to the acquired information.

The migration processing unit 912A transmits the acquired files to the migration processing unit 912B of the archive device 3B (S2108). The migration processing unit 912B of the archive device 3B transmits a storing request of the received file data from the file storage 3A to the processing request accepting unit 914B (S2109). The received file data includes the file data main body as well as the old metadata managed by the inode management table 1012 in the file system 913A of the file storage 3A. The processing request accepting unit 914B stores the received file data in the logical volume (LU) 513B of the storage system 10B coupled to the archive device 3B via the kernel/driver 916B (S2110, S2111).

Figure 22:
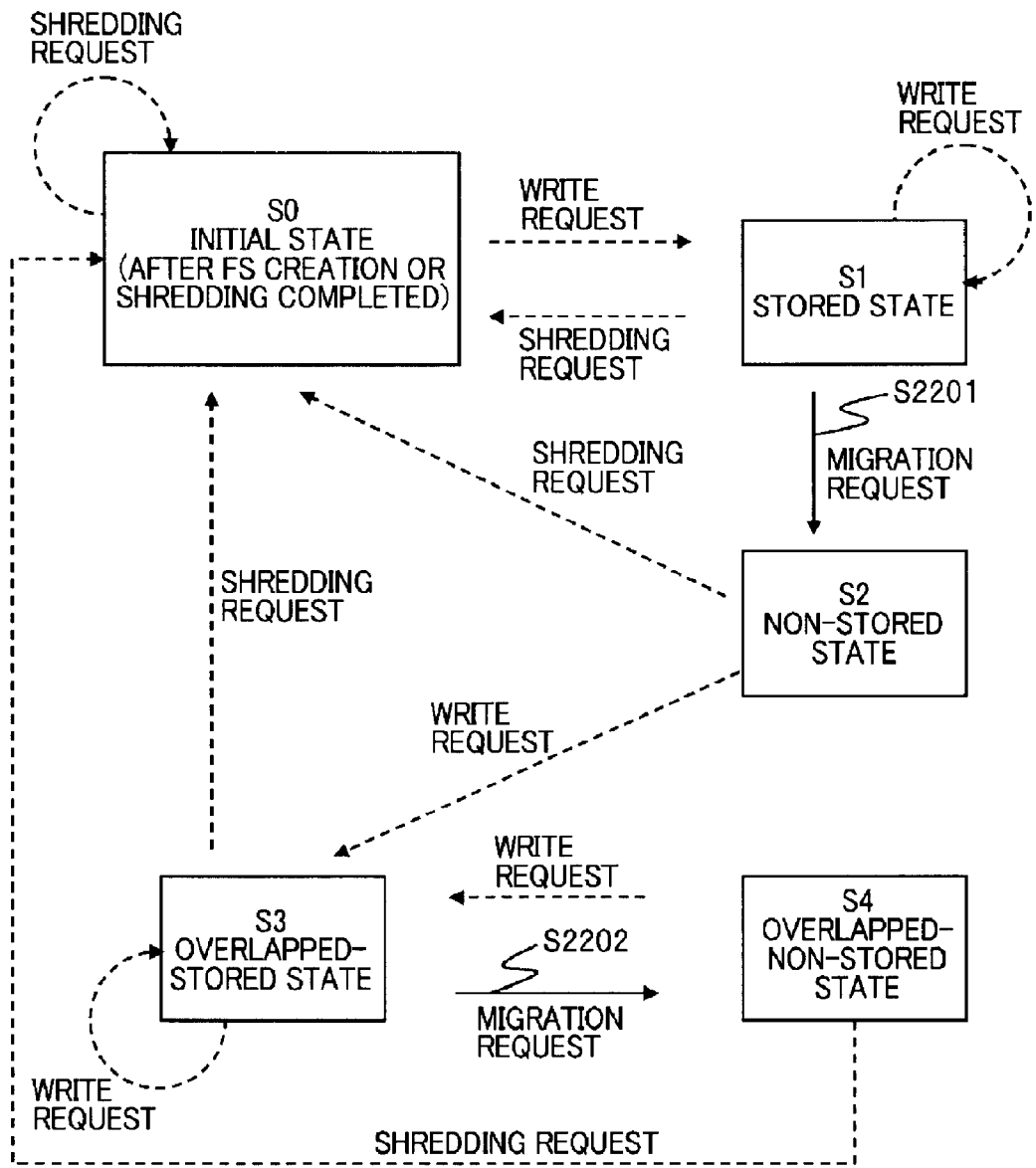
FIG. 22 is a schematic diagram explaining a block status transition when a migration request is accepted.

FIG. 22 shows a schematic explanatory diagram of block state transition at the time of migration request processing. As mentioned above, the state of the data block after the execution of the migration differs according to the state of the data block in which data is written. When migration processing is performed on a data block which is in the stored state S1, the state of the data block is in the non-stored state S2, in which other data is storable (S2201), with reference to the block state transition table 922. When migration processing is performed on a data block in the overlapped-stored state S3, the state of the data block is in the overlapped-non-stored state S4, in which other data is storable again (S2202), with reference to the block state transition table 922.

Figure 23:
FIG. 23 is a diagram showing an update process of the block status management table 921 when a migration request is accepted.

FIG. 23 shows an update example of the block state management table 921 at the time of the migration request processing described above. FIG. 23 shows that when a migration request is processed to data blocks of the block addresses 0 and 1 which are in states S1 and S3, respectively, the states of the data blocks are changed, but the overlap times are not changed.

Processing of Shredding Request

Figure 24:
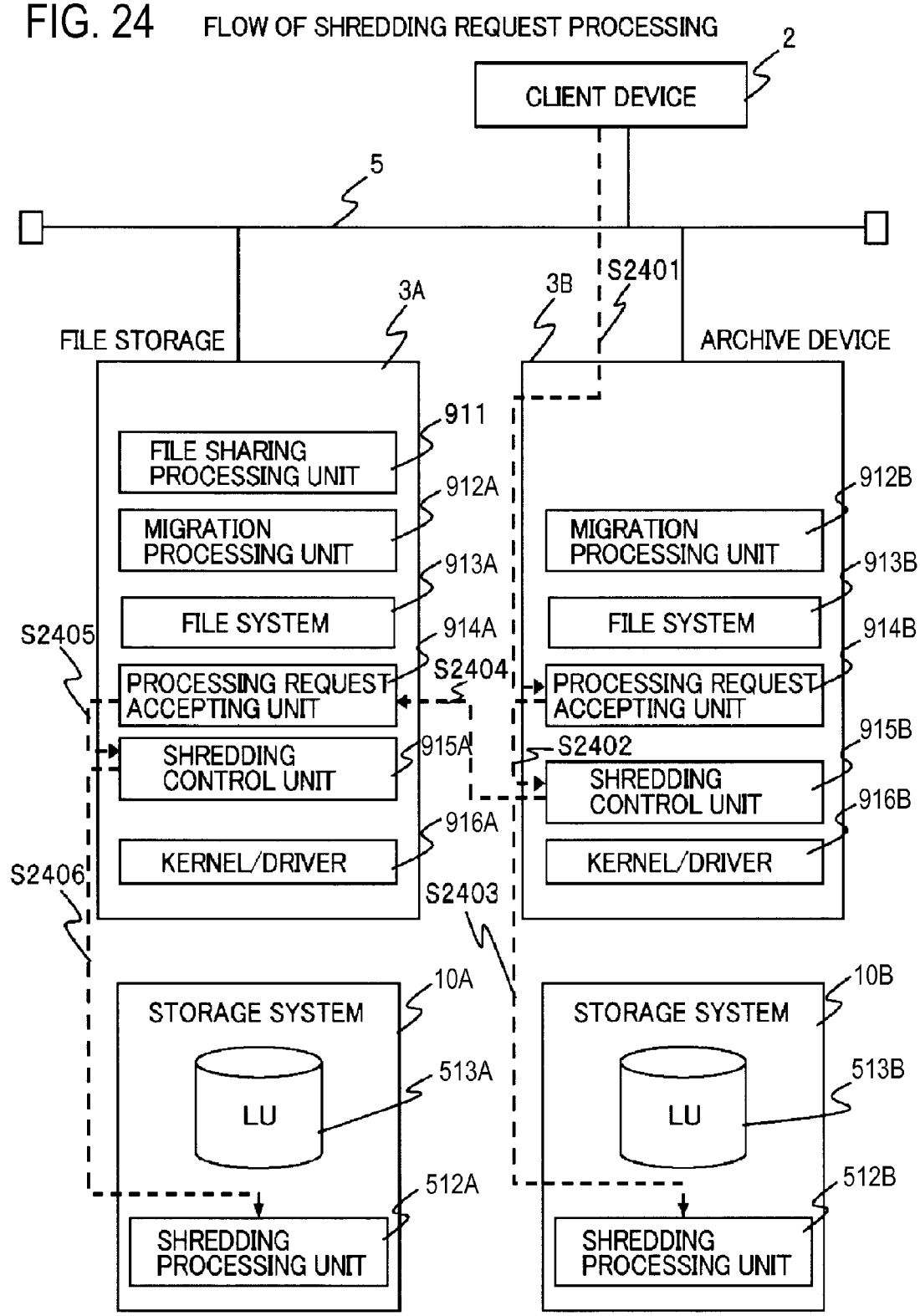
FIG. 24 is a schematic diagram showing a flow of a shredding request processing.

In FIG. 24, a description is given of processing of a shredding request in the information processing system 1 of the Example. First, the shredding control unit 915B of the archive device 3B side accepts a shredding request for a file from the client device 2 via the processing request accepting unit 914B (S2401, S2402). The shredding control unit 915B transmits a shredding request for the block address where the file is stored (S2403) to the shredding processing unit 512B, which is a microprogram installed in the storage system 10B. Then, the shredding control unit 915B transmits the old block address included in the old metadata acquired from the inode management table 1012 of the file system 913B (storing address in the file storage 3A of the target block data to be shredded) in relation to the block address, to the shredding control unit 915A of the file storage 3A via the processing request accepting unit 914A (S2404, S2405).

When the shredding control unit 915A of the file storage 3A accepts a shredding request from the archive device 3B, the shredding control unit 915A checks the old block address in the old metadata included in the accepted shredding request with the block state management table 921. Based on the checking result, the shredding control unit 915A makes a shredding request to the shredding processing unit 512A of the storage system 10A (S2406).

Figure 25:
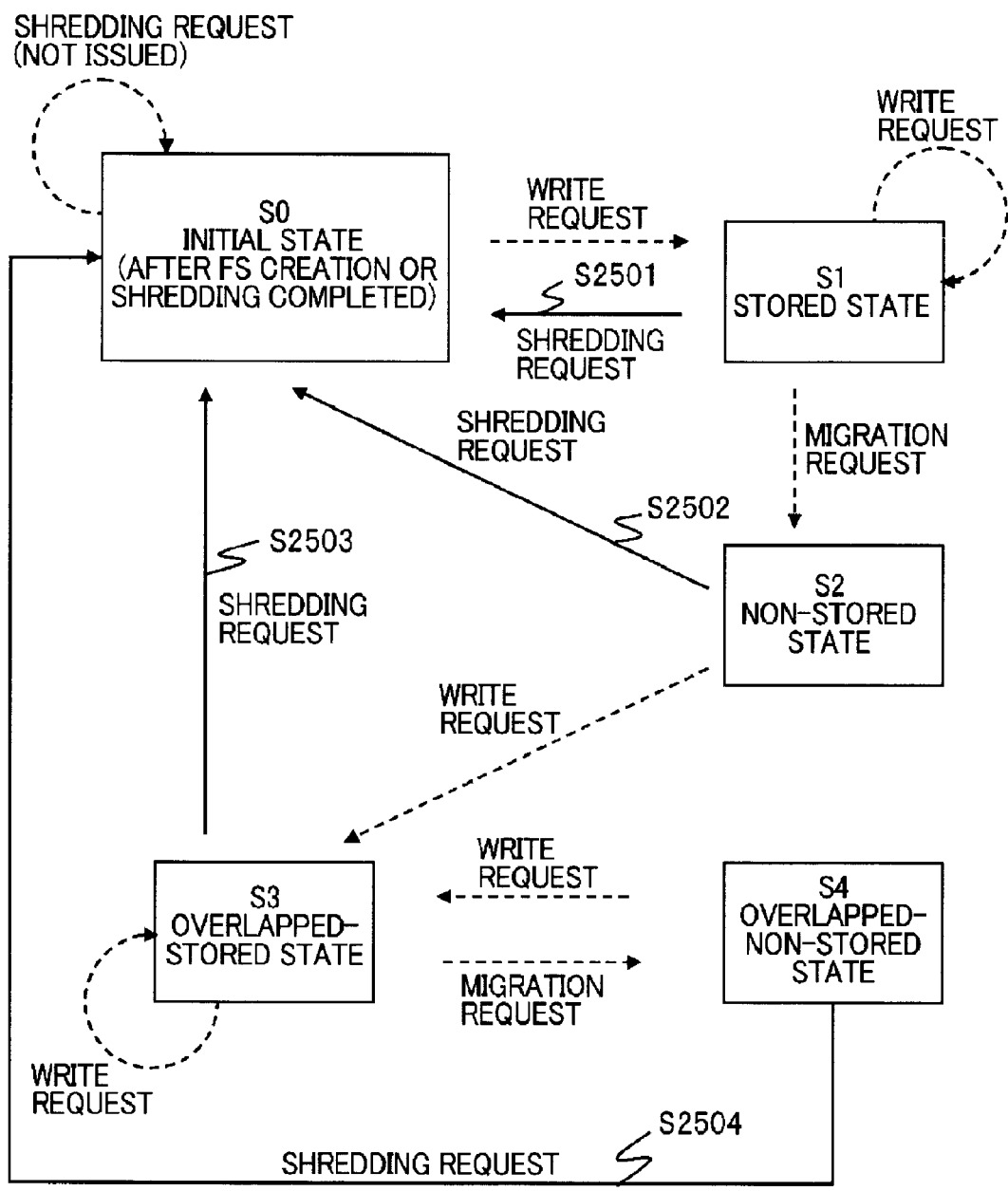
FIG. 25 is a schematic diagram explaining a block status transition when a shredding request is accepted.

FIG. 25 shows a schematic explanatory diagram of block state transition at the time of shredding request processing. As mentioned above, the state of the data block after the operation of the shredding differs according to the state of the data block in which data is written. In the case that the state of the target data block to be shredded is S0, the block remains in the same state as that at the time of the file system creation or should have been shredded. Thus shredding processing is not performed. In the case that the state of the target data block to be shredded is S1, the case assumes that the file storage 3A has accepted the shredding request from the client device 2 before the file is migrated to the archive device 3B, and thus shredding is performed (S2501). Since the file data stored in the target data block to be shredded has not been migrated yet, a shredding request from archive device 3B is not to be received.

In the case that the state of the target data block to be shredded is S2, since there is no overlapped portion between the target data and other written data, the shredding request is performed and the state of the data block makes a transition to S0 (S2502). In the case that the state of the target data block to be shredded is S3, since there is an overlapped portion between the target data and the data written after the last migration, and the file data stored in the block address is in use, the shredding request is performed after moving the data to another area (for example, at a block address in the state S0), so that the state S3 is changed to the state S0 and the overlap times 9213 is reset to zero (S2503). In the case that the state of the target data block to be shredded is S4, although there is an overlapped portion between the target data and the data written after the last migration, the file data stored in the block address is not in use. Thus, shredding processing is performed, and the state S4 is changed to the state S0 and the overlap times 9213 is reset to zero (S2504).

Figure 26:
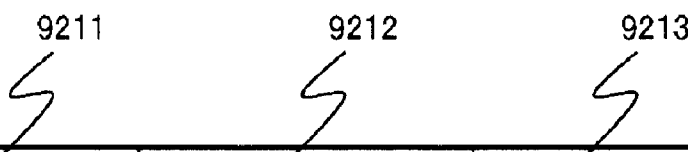
FIG. 26 is a diagram showing an update process of the block status management table 921 when a shredding request is accepted.

FIG. 26 shows an update example of the block state management table 921 at the time of the shredding request processing described above. FIG. 26 shows that for the block addresses 0-4 (9211), each block state 9212 makes a transition to S0, and the overlap times 9213 is reset to zero regardless of the state before the shredding processing.

FIG. 27 shows an update example of the block state management table 922, which includes the corresponding processing actually performed by the file storage 3A to the processing requests described above. By referring to the block state transition table 922, the migration processing unit 912, the processing request accepting unit 914, and the shredding control unit 915 of the file storage 3A can acquire the information related to the processing that should be actually performed corresponding to the types of processing requests, as well as the state of the data block before and after state transition.

More specifically, the example of FIG. 27 shows the before-transition state indicating the state before the transition according to specific processing in the column direction of the block state transition table 922, and the after-transition state indicating the state after the transition in the row direction thereof. In FIG. 27, under each processing request, corresponding operations to be processed are described. For example, by referring to the block state transition table 922 of FIG. 27, one can obtain the information that when a "shredding request" is accepted for a data block in the state S3 (overlapped-stored state), the following processing is to be executed as described above: "after the data stored in the block is moved to another area, shredding processing is performed so that the block state 9212 of the block state management table 921 is changed to S0 and the overlap times 9213 is reset to zero."

Specific Example of Processing According to Example 1

Figure 28:
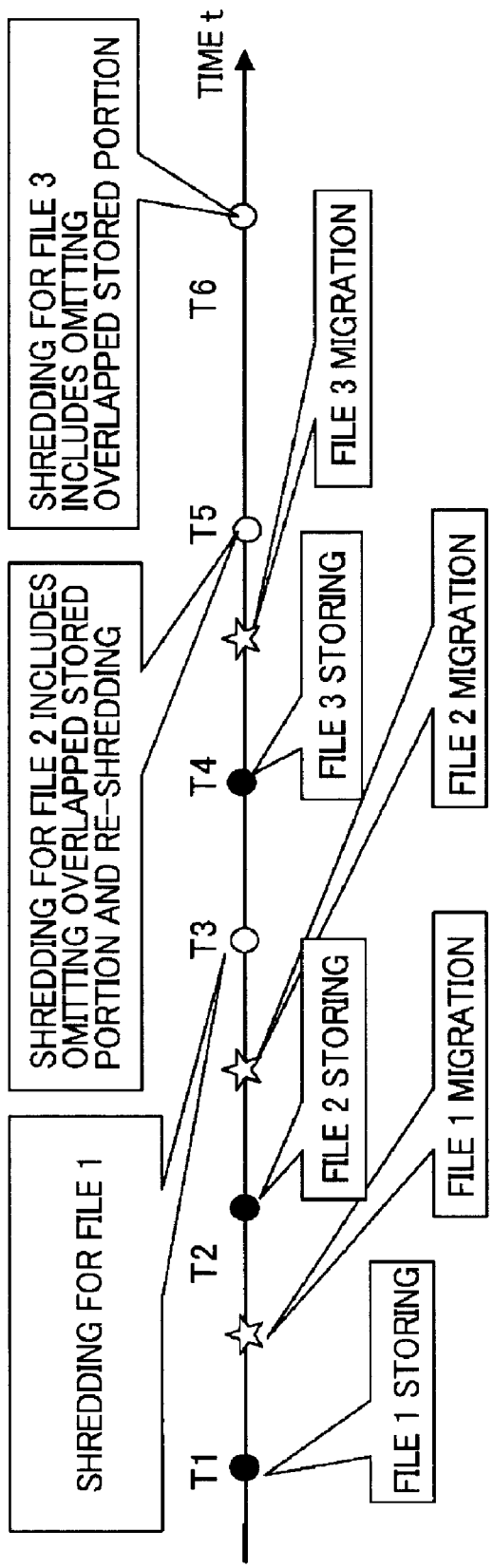
FIG. 28 is a diagram showing a hypothetical operation procedure for explaining an operation of Example 1.

Next, the file processing by the file storage 3A and the archive device 3B in the information processing system 1 of the Example is described with a specific example. FIG. 28 schematically shows a hypothetical operation procedure for explaining the file processing by the file storage 3A and the archive device 3B. As shown in FIG. 28, with the hypothetical operation procedure, various file operations are performed in the file storage 3A and the archive device 3B along time axis t, from time T1 to time T6. Hereinbelow, these operations of file processing are described with reference to FIGS. 29 to 34. FIGS. 29 to 34 are schematic diagrams showing each file processing performed in FIG. 28, associated with corresponding update processing of the block state management table 921 held in the file storage 3A so that overlapped storing conditions of the data blocks included in each file are made clear.

Storing Processing of File F1 to File Storage 3A

Figure 29:
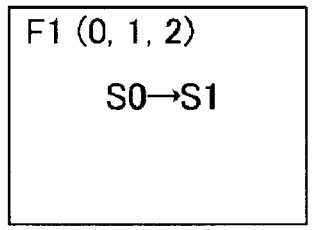
FIG. 29 is a schematic diagram showing a storing status of a file F1 (t=T1).

FIG. 29 shows updating conditions of the block state management table 921 in the case that storing of a file identified by characters F1 (hereinafter referred to as "file F1") is performed in the storage 3A at time T1 of FIG. 28. Now, in the block state management table 921, it is assumed that the states of data blocks at block addresses 0-4, which can be used by the file storage 3A, are managed. The rectangle figure illustrated in the upper portion of FIG. 29 schematically shows file F1, and the characters F1 (0, 1, 2) show that the file F1 includes the data stored in the block addresses 0-2. Thus, in the block state management table 921 of the file storage 3A, storing the file F1 causes the block states 9212 of the block addresses 0-2 to change from S0 to S1 as defined in the block state transition table 922 (FIG. 27). The block state 9212 and the overlap times 9213 of block addresses 3 and 4 are not changed.

Migration of File F1 and Storing of File F2

Figure 30:
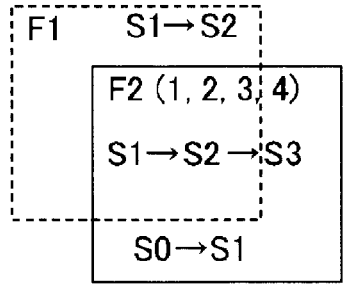
FIG. 30 is a schematic diagram showing a storing status of a file F2 (t=T2) after a file F1 migration.

Next, migration processing of the file F1 from the file storage 3A to the archive device 3B, and subsequent storing processing of the file F2 in the file storage 3A are described using FIG. 30. As shown in FIG. 30, migration of the file F1 causes the block states 9212 of the block addresses 0-2 where the file F1 has been stored to make a transition from S1 to S2 as defined in the block state transition table 922 of FIG. 27. On the other hand, subsequent storing of the File F2 (1, 2, 3, 4) in the file storage 3A also causes the states of the block addresses 1 and 2 to make a transition from S2 to S3, and causes the states of the block addresses 3 and 4 to make a transition from S0 to S1 as defined in the block state transition table 922 of FIG. 27. After the migration processing, data is stored again in the block addresses 1 and 2. Upon the transition of the block states 9212 of the block addresses to the overlapped-stored state S3, the overlap times 9213 corresponding to the block addresses 1 and 2 are incremented to 1.

Migration of File F2 and Shredding of File F1

Next, suppose that after the file F2 is migrated from the file storage 3A to the archive device 3B, shredding of the file F1, which had already been migrated to the archive device 3B, is to be performed in the archive device 3B. Shredding processing of the data block in which the file F1 had been previously stored in the file storage 3A, performed along with the shredding of the file F1 is described using FIG. 31.

Upon migration of the file F2 to the archive device 3B, the states of the block addresses 1 and 2 in an overlapped-stored state make a transition from S3 to S4 (overlapped-non-stored state), and the states of the block addresses 3 and 4 in a stored state make a transition from S1 to S2, as defined in the block state transition table 922 of FIG. 27.

Then after the above-mentioned migration, shredding is performed on the block addresses 0-2 where the file F1 (0, 1, 2) had been previously stored, and accordingly the block state 9212 of the block address 0 in the state S2 and the block states 9212 of the block addresses 1 and 2 in the state S4 all make a transition to S0. The overlap times 9213 of the block addresses 1 and 2 are reset to zero, as defined in the block state transition table 922 of FIG. 27.

Storing of File F3

Figure 32:
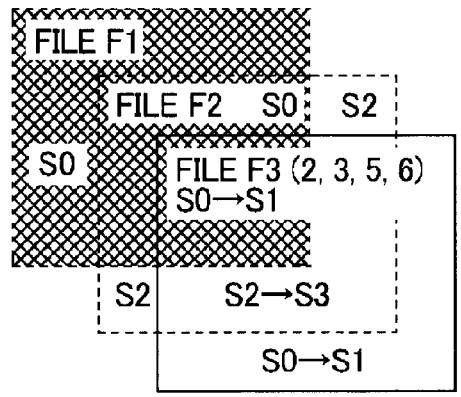
FIG. 32 is a schematic diagram showing a storing status of a file F3 (t=T4).

Next, storing processing of the file F3 (2, 3, 5, 6) in the file storage 3A is described using FIG. 32. Upon storing of the file F3 in the file storage 3A, the block states 9212 of the block addresses 2, 5, 6 in the initial state S0 make a transition to S1, and the block state 9212 of the block address 3 in the non-stored state S2 makes a transition to S3, as defined in the block state transition table 922 of FIG. 27. For the block address S3, since the after-transition state is in the overlapped-stored state S3, the corresponding overlap times 9213 is incremented to 1.

Migration of File F3 and Shredding of File F2

Next, suppose that after the file F3 is migrated from file storage 3A to the archive device 3B, shredding of the file F2, which had already been migrated to the archive device 3B, is to be performed in the archive device 3B. Shredding processing of the data block in which the file F2 had been previously stored in the file storage 3A, performed along with the shredding of the file F2 is described using FIG. 33.

Upon migration of the file F3 (2, 3, 5, 6) to the archive device 3B, the state of the block address 3 in the overlapped-stored state S3 makes a transition from S3 to S4 (overlapped-non-stored state), and the states of the block addresses 2, 5, 6 in the stored state S1 make a transition from S1 to S2, as defined in the block state transition table 922 of FIG. 27.

After the above-mentioned migration, a shredding request is then made to the block addresses 1-4 where the file F2 (1, 2, 3, 4) had been previously stored. In this case, as defined in the block state transition table 922 of FIG. 27, shredding is performed on the block addresses 2, 4 in the non-stored state S2 and the block address 3 in the overlapped-non-stored state S4 so that the states of the block addresses 2, 3, 4 make a transition to the initial state S0. At the same time, for the block address 3, the overlap times 9213 is reset to zero according to the block state transition table 922 of FIG. 27.

Figure 31:
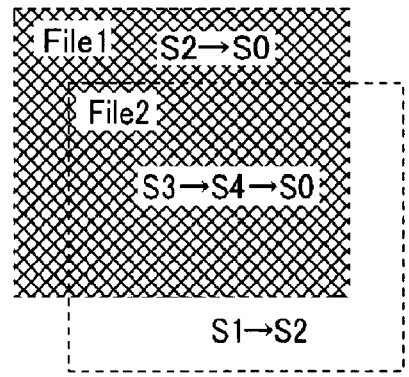
FIG. 31 is a schematic diagram showing a shredding status of the file F1 (t=T3) after a file F2 migration.

On the other hand, the state of the block address 1 is in the initial state S0 as a consequence of the shredding shown in FIG. 31, and thus shredding is not performed even if requested as defined in the block state transition table 922 of FIG. 27. Therefore, the shredding processing unit 512 of the storage system 10 coupled to the file storage 3A has less processing load for performing shredding associated with the block address 1.

Shredding of File F3

Next, suppose that shredding of the file F3, which had already been migrated to the archive device 3B, is to be performed in the archive device 3B. Shredding processing of the data block in which the file F3 had been previously stored in the file storage 3A, performed along with the shredding of the file F3 is described using FIG. 34.

When a shredding request is made to the block addresses 2, 3, 5, 6 where the file F3 (2, 3, 5, 6) had been previously stored, shredding is performed on the block addresses 5, 6 in the non-stored state S2 as defined in the block state transition table 922 of FIG. 27, so that the state of each block address makes a transition to the initial state S0.

Figure 33:
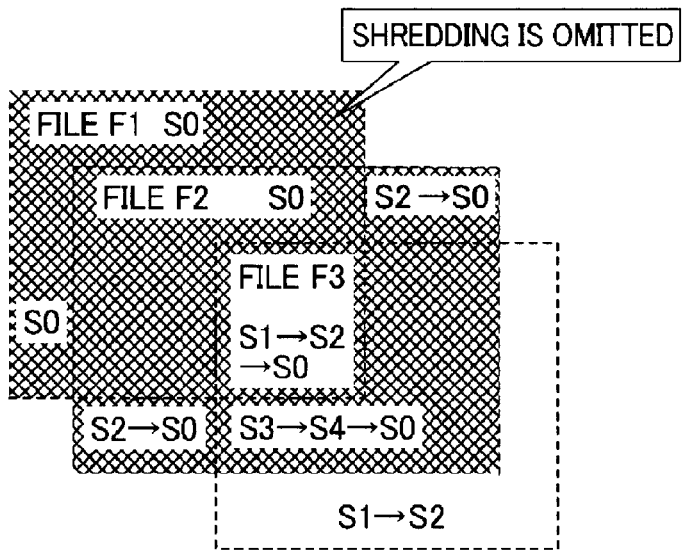
FIG. 33 is a schematic diagram showing a shredding status of the file F2 (t=T5) after a file F3 migration.
Figure 34:
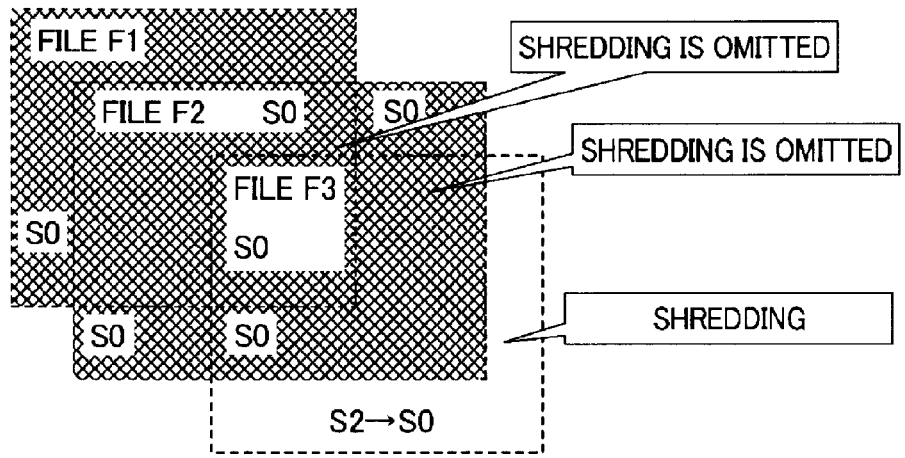
FIG. 34 is a schematic diagram showing a shredding status of the file F3 (t=T6).

On the other hand, the states of the block addresses 2, 3 are in the initial state S0 as a consequence of the shredding shown in FIG. 33, and thus shredding is not performed even if requested as defined in the block state transition table 922 of FIG. 27. Therefore, the shredding processing unit 512 of the storage system 10 coupled to the file storage 3A has less processing load for performing shredding associated with the block addresses 2, 3.

As described above, after one file is migrated, file storing after the migration and the block state of each data block due to shredding are continuously managed for the data block in which the file had been stored. Thus, when the block state is determined to indicate that shredding had already been performed on the data blocks, shredding can be omitted, and thereby processing load associated with the shredding operation in the file storage 3A and the storage system 10 can be reduced as much as possible.

Description of Data Processing Flow in File Storage 3A and Archive Device 3B

Next, an example of a data processing flow to implement file processing in the file storage 3A and the archive device 3B which have been explained so far is described with reference to FIGS. 35 to 40.

Processing Flow in Processing Request Accepting Unit 914 in File Storage 3A

Figure 35:
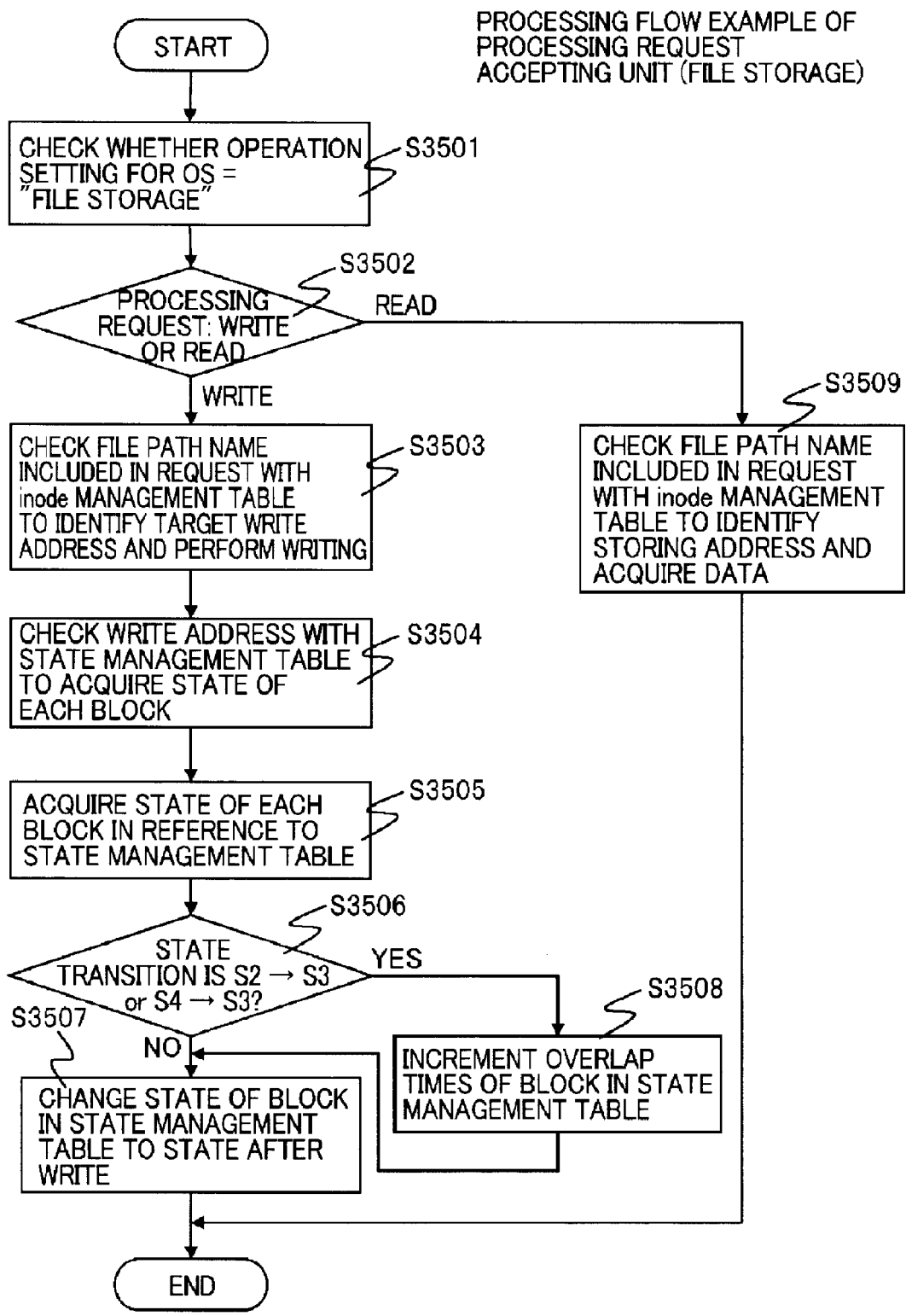
FIG. 35 is an example of processing flow of a processing request accepting unit 914 (a file storage 3A side).

FIG. 35 shows an example of a data processing flow performed by the processing request accepting unit 914 in the file storage 3A. In the processing request accepting unit 914, write and read requests received from the client device 2, and the like are processed.

First, the processing request accepting unit 914 checks whether an operation mode as "file storage" is set (S3501) in the OS operating in the server device 3 to which the processing request accepting unit 914 belongs, and determines whether a processing request received via the communication network 5 from the client device 2, and the like is a "write request" or "read request" (S3502). When the request is determined to be a "read request", the processing request accepting unit 914 checks the file path name included in the received read request with the mode management table 1012 in the file system 913 to identify the storing address of the file data associated with the read request. The processing request accepting unit 914 then acquires relevant file data from the storage system 10 to transmit the file data to the request source device such as the client device 2 (S3509).

On the other hand, when the processing request, which has been received by the processing request accepting unit 914 in S3502, is determined to be a "read request", the processing request accepting unit 914 checks the file path name included in the received write request with the mode management table 1012 in the file system 913 to identify the storing address of the file data associated with the write request. The processing request accepting unit 914 then causes the storage system 10 to write relevant file data thereto (S3503).

With the write address, the processing request accepting unit 914 refers to the block state management table 921 held by the file storage 3A to which the processing request accepting unit 914 belongs, and then acquires the block state 9212 set with regard to the write address (S3504). Subsequently, the processing request accepting unit 914 refers to the block state transition table 922 held by the file storage 3A to which the processing request accepting unit 914 also belongs, and acquires a block state 9212, to which a transition is to be made when the write request is performed on each data block having the acquired block state 9212 (S3505).

The processing request accepting unit 914 compares the block state of each block address before processing the write request acquired in S3504 with the after-transition block state 9212 of each data block acquired in S3505 to determine whether the state transition in each data block is from the state S2 (non-stored state) to the state S3 (overlapped-stored state), or from the state S4 to the state S3 (S3506).

In the case that the state transition in each data block is determined from the state S2 (non-stored state) to the state S3 (overlapped-stored state), or from the state S4 to the state S3 (S3506, Yes), the processing request accepting unit 914 increments the overlap times 9213 corresponding to the block address 9211 matching to the state transition in the block state management table 921 (S3508). Then the processing request accepting unit 914 updates the block state 9212 of the block address 9211 to the block state 9212 after the write processing to terminate the processing where the block address 9211 corresponds to the data block associated with the write request to the block state management table 921 (S3507).

In the case that the state transition in each data block is determined neither from the state S2 to the state S3, nor from the state S4 to the state S3 (S3506, No), the processing request accepting unit 914 updates the block state 9212 of the block address 9211 to the block state 9212 after the write processing to terminate the processing where the block address 9211 corresponds to the data block associated with the write request to the block state management table 921 (S3507).

According to the above processing, when the write request of a file is processed in the file storage 3A, overlapped data storing conditions of each data block belonging to multiple files are continuously managed.

Processing Flow in Processing Request Accepting Unit 914 of Archive Device 3B

Figure 36:
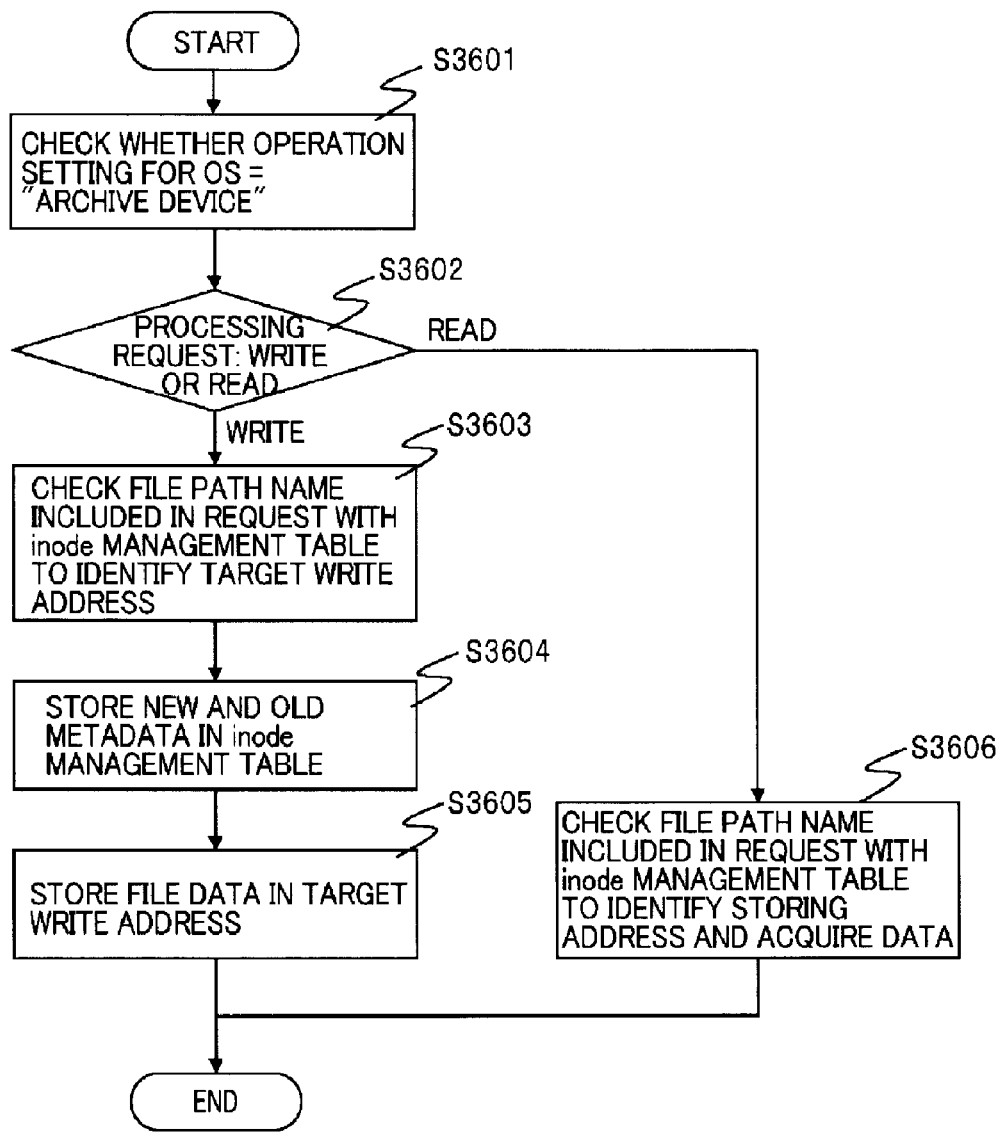
FIG. 36 is an example of processing flow of a processing request accepting unit 914 (an archive device 3B side).

FIG. 36 shows an example of a data processing flow performed by the processing request accepting unit 914 of the archive device 3B. In the processing request accepting unit 914, a write request associated with migration from the file storage 3A and a read request received from the client device 2, and the like are processed.

First, the processing request accepting unit 914 checks whether an operation mode as "archive device" is set (S3601) in the OS operating in the server device 3 to which the processing request accepting unit 914 belongs, and determines whether a processing request received via the communication network 5 from the file storage 3A, the client device 2, and the like is a "write request" or "read request" (S3602). When the request is determined to be a "read request" (S3602, read), the processing request accepting unit 914 checks the file path name included in the received read request with the inode management table 1012 in the file system 913 to identify the storing address of the file data associated with the read request. The processing request accepting unit 914 then acquires relevant file data from the storage system 10 to transmit the file data to the request source device such as the client device 2 (S3606).

On the other hand, when the processing request, which has been received by the processing request accepting unit 914 in S3602, is determined to be a "read request" (S3602, write), the processing request accepting unit 914 checks the file path name included in the received write request with the inode management table 1012 in the file system 913 to identify the storing address of the file data associated with the write request (S3603).

Subsequently, the processing request accepting unit 914 stores old and new metadata related to the data associated with the write request acquired from the received write request to the inode management table 1012 held by the file system 913 of the archive device 3B to which the processing request accepting unit 914 belongs (S3604). Subsequently, the processing request accepting unit 914 causes the storage system 10 to stores the file data main body associated with the received write request to the write destination address as designated system 10 (S3605).

According to the above processing, the inode management table 1012 held by the file system 913 of the archive device 3B records the following block addresses in a corresponding manner: the file storage destination block address in the archive device 3B (new metadata), and the block address where the file had been stored in the file storage 3A (old metadata). Thus, when a shredding request of a file is processed in the archive device 3B, the shredding request to the storing block address of the file can be issued to the file storage 3A.

Processing Flow in Migration Processing Unit 912 of File Storage 3A

Figure 37:
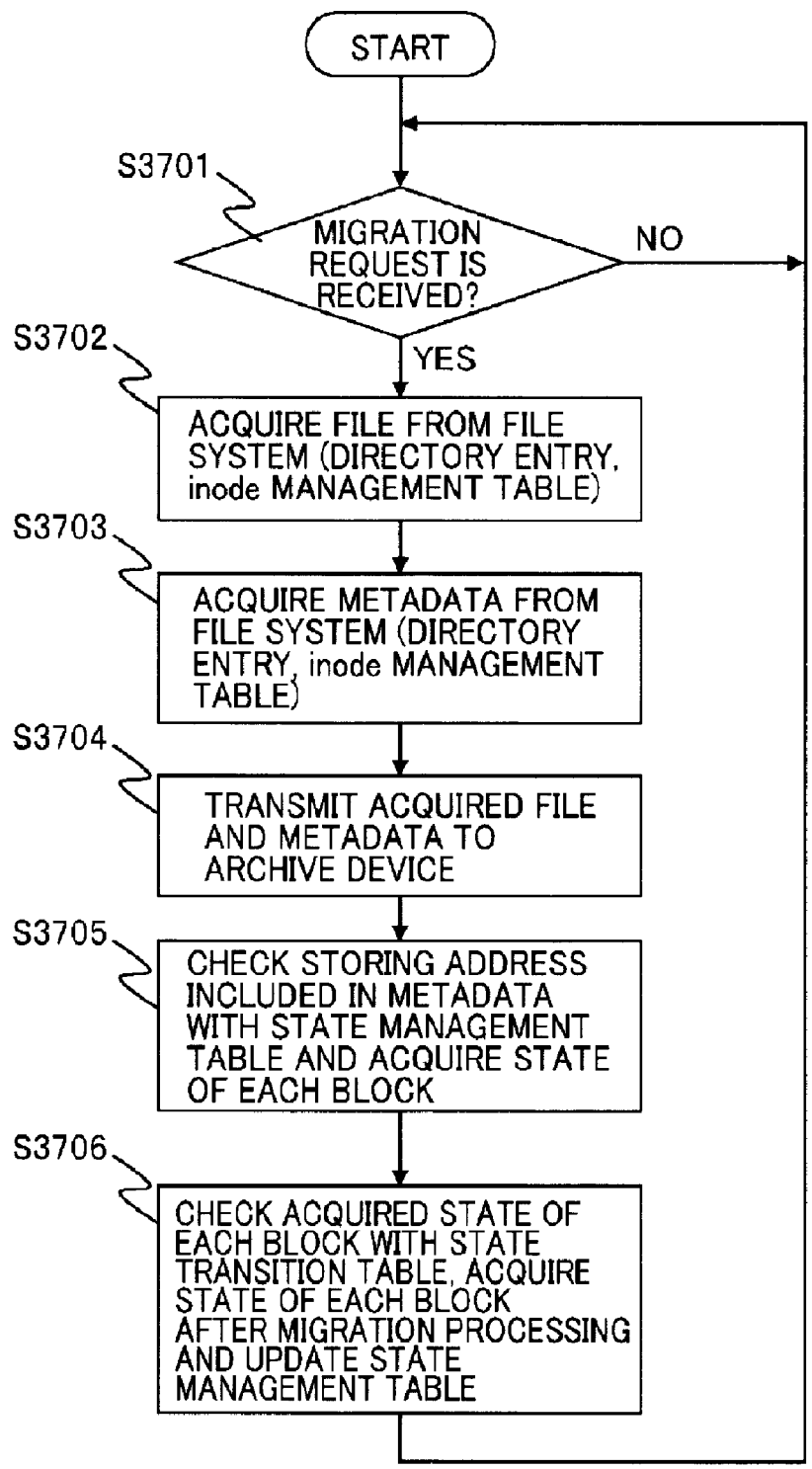
FIG. 37 is an example of processing flow of a migration processing unit 912 (the file storage 3A side).

FIG. 37 shows an example of a data processing flow performed by the migration processing unit 912 of the file storage 3A. In the migration processing unit 912, a migration request received from the client device 2 and the like is processed.

First, the migration processing unit 912 determines whether a migration request from the client device 2, and the like is received (S3701). If it is not (S3701, No), the migration processing unit 912 stands by to receive a migration request.

When it is determined that a migration request has been received (S3701, Yes), the migration processing unit 912 refers to the Mode management table 1012 and the directory entry 1200 held by the file system 913 of the file storage 3A to which the migration processing unit 912 belongs, and acquires the file data associated with the migration request from the storage system 10 (S3702).

The migration processing unit 912 then refers to the mode management table 1012 and the directory entry 1200 of the file system 913 to acquire the metadata related to the file data associated with the migration request (S3703), and transmits the file data as well as another file data acquired in S3702 to the migration processing unit 912 of the archive device 3B via communication network 5 (S3704).

The migration processing unit 912 checks the storing block address of the file data associated with the migration request included in the metadata acquired in S3703 with the block state management table 921 held by the file storage 3A to which the migration processing unit 912 belongs, and acquires the block state 9212 of each block address (S3705).

The migration processing unit 912 then checks the block state 9212 of each block address acquired in S3705 with the block state transition table 922 held by the file storage 3A to which the migration processing unit 912 belongs, and acquires the block state 9212 after the migration request is processed to each block address to update the block state 9212 of the block address in the block state management table 921 (S3706).

According to the above processing, when migration from the file storage 3A to the archive device 3B is performed, the metadata of the file data as well as the target file data for migration are transmitted to the archive device 3B. Thus, the archive device 3B acquires the storing block address in the file storage 3A of the file data which has been migrated.

Processing Flow in Migration Processing Unit 912 of Archive Device 3B

Figure 38:
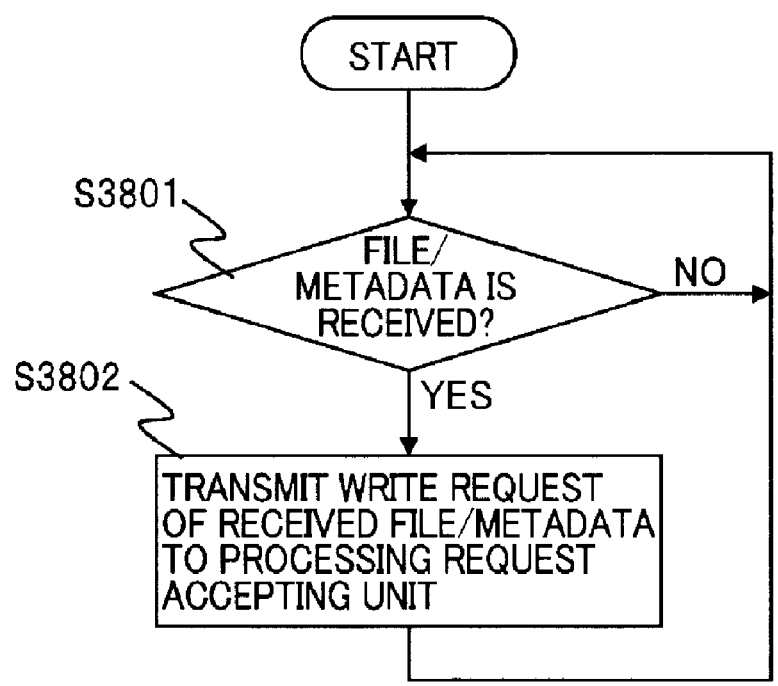
FIG. 38 is an example of processing flow of the migration processing unit 912 (the archive device 3B side).

FIG. 38 shows an example of a data processing flow performed by the migration processing unit 912 of the archive device 3B. In the migration processing unit 912, receive processing of file data and the like migrated from the file storage 3A is performed.

First, the migration processing unit 912 determines whether file data and the metadata associated with the file data are received from the file storage 3A (S3801). If it is not (S3801, No), the migration processing unit 912 stands by to receive file data and the metadata.

If it is determined that file data and metadata are received (S3801, Yes), the migration processing unit 912 transmits a write request of the received file data and metadata to the processing request accepting unit 914 of the archive device 3B to which the migration processing unit 912 belongs (S3802). In the processing request accepting unit 914, according to the write request from the migration processing unit 912, processing of the write request as illustrated with FIG. 36 is performed.

According to the above processing, when migration from the file storage 3A to the archive device 3B is performed, the metadata of the file data as well as target file data for migration are received by the archive device 3B. Thus, the archive device 3B acquires the storing block address (old metadata) in the file storage 3A of the file data which has been migrated.

Processing Flow in Shredding Control Unit 915 of File Storage 3A

Figure 39:
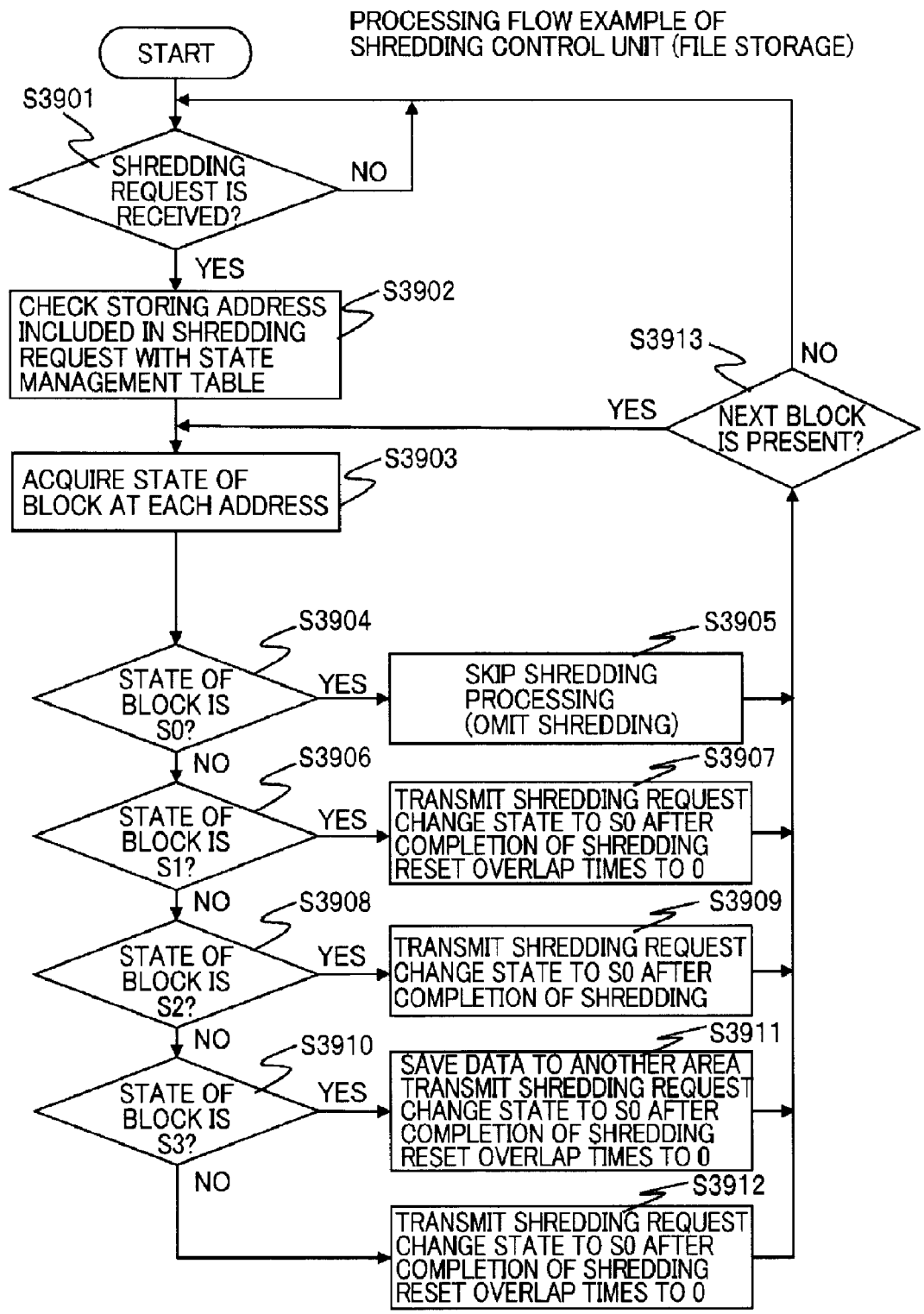
FIG. 39 is an example of processing flow of a shredding control unit 915 (the file storage 3A side).

FIG. 39 shows an example of a data processing flow performed by the shredding control unit 915 of the file storage 3A. In the shredding control unit 915, a shredding request received from the archive device 3B, client device 2, and the like is processed.

First, the shredding control unit 915 determines whether a shredding request has been received from the archive device 3B, the client device 2, or the like (S3901). If it is not (S3901, No), the shredding control unit 915 stands by to receive a shredding request.

If it is determined that a shredding request has been received (S3901, Yes), the shredding control unit 915 checks the storing block address of the file data included in the received shredding request with the block state management table 921 (S3902), and acquires the block state 9212 recorded in the block state management table 921, the block state 9212 corresponding to each block address 9211 (S3903).

The shredding control unit 915 then checks the block state 9212 of each block address (S3904, S3906, S3908, S3910) to control processing for the shredding request to each block address according to the block state 9212 of the acquired block address.

First, the shredding control unit 915 determines whether the block state 9212 of the block address, which corresponds to one of the data blocks included in the file data associated with the shredding request, is in the state S0 (the initial state) (S3904). If it is determined that the block state is in the state S0 (S3904, Yes), the shredding control unit 915 does not perform shredding processing for the block address (shredding processing is omitted) (S3905), and proceeds to the step (S3913) to determine whether the next block address associated with the shredding request is present.

In S3913, if the shredding control unit 915 determines that next block address is present (S3913, Yes), the processing proceeds to S3903 to acquire the block state 9212 recorded in the block state management table 921, in relation to the next block address. If the next block address is determined to be absent (S3913, No), the shredding control unit 915 determines that the processing related to all the block addresses associated with the received shredding request has been completed. The shredding control unit 915 then returns the processing to the step S3901 of shredding request reception standby. The processing related to S3913 also applies to the following description.

In S3904, if it is determined that the block state 9212 of the block address is not in the state S0 (S3904, No), the shredding control unit 915 determines whether the block state 9212 of the block address determined in S3904 is in the state S1 (stored state) (S3906). If it is determined that the block state 9212 is in the state S1 (S3906, Yes), the shredding control unit 915 transmits the shredding request of the block address to the shredding processing unit 512 of the storage system 10. Upon receiving a shredding completion notification, the shredding control unit 915 changes the corresponding block state 9212 to the state S0 in the block state management table 921, and resets the corresponding overlap times 9213 to zero (S3907). Subsequently, in the shredding control unit 915, the processing proceeds to S3913.

In S3906, if it is determined that the block state 9212 of the block address is not in the state S1 (S3906, No), the shredding control unit 915 determines whether the block state 9212 of the block address determined in S3906 is in the state S2 (non-stored state) (S3908). If it is determined that the block state 9212 is in the state S2 (S3908, Yes), the shredding control unit 915 transmits the shredding request of the block address to the shredding processing unit 512 of the storage system 10. Upon receiving a shredding completion notification, the shredding control unit 915 changes the corresponding block state 9212 to the state S0 in the block state management table 921 (S3909). In the case that the block state 9212 is in the non-stored state S2, since increment of the overlap times due to overlapped storing of the file data has not occurred as defined in the block state transition table 922 of FIG. 27, the overlap times 9213 is not reset to zero. Subsequently, in the shredding control unit 915, the processing proceeds to S3913.

In S3908, if it is determined that the block state 9212 of the block address is not in the state S2 (S3908, No), the shredding control unit 915 determines whether the block state 9212 of the block address determined in S3908 is in the state S3 (overlapped-stored state) (S3910). If it is determined that the block state 9212 is in the state S3 (S3910, Yes), the shredding control unit 915 transmits, to the shredding processing unit 512 of the storage system 10, the shredding request of the block address as well as a request to move in-use file data stored in the block address to unused storage area such as no data stored area. Upon receiving a shredding completion notification, the shredding control unit 915 changes the corresponding block state 9212 to the state S0 in the block state management table 921, and resets the corresponding overlap times 9213 to zero (S3911). Subsequently, in the shredding control unit 915, the processing proceeds to S3913.

In S3910, if it is determined that the block state 9212 of the block address is not in the state S3 (S3910, No), the shredding control unit 915 determines whether the block state 9212 of the block address determined in S3910 is in the state S4 (overlapped-non-stored state). Then the shredding control unit 915 transmits, to the shredding processing unit 512 of the storage system 10, the shredding request of the block address as well as a request to move in-use file data stored in the block address to unused storage area such as no data stored area. Upon receiving a shredding completion notification, the shredding control unit 915 changes the corresponding block state 9212 to the state S0 in the block state management table 921, and resets the corresponding overlap times 9213 to zero (S3912). Subsequently, in the shredding control unit 915, the processing proceeds to S3913.

According to the above processing, the shredding control unit 915 of the file storage 3A does not perform shredding processing for the block address when the state of the target block address of the shredding request is S0 (the initial state), which indicates that the file system 913 has not been used since its creation, or other data has not been stored after previous shredding processing. Thus, processing load associated with the shredding operation in the storage system 10 can be reduced as much as possible.

Processing Flow in Shredding Control Unit 915 of Archive Device 3B

Figure 40:
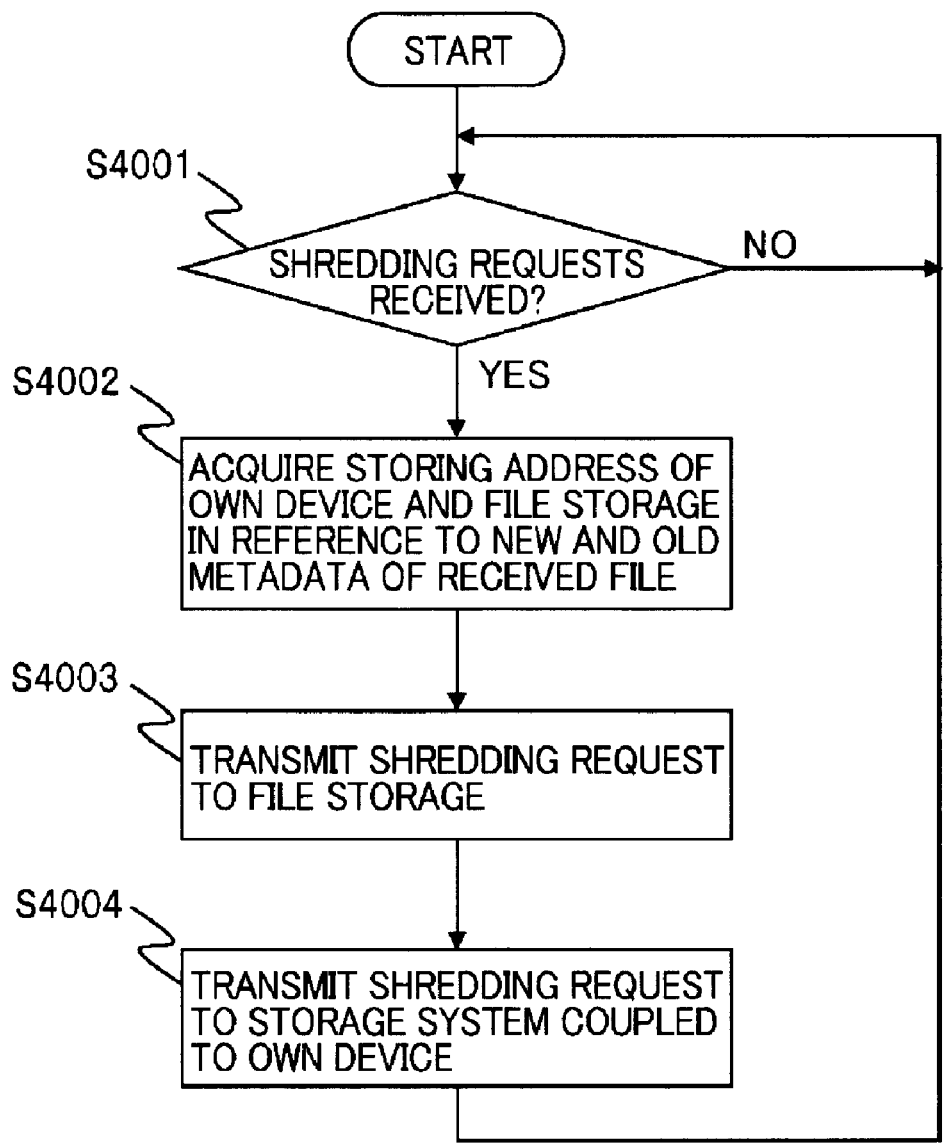
FIG. 40 is an example of processing flow of the shredding control unit 915 (the archive device 3B side).

FIG. 40 shows an example of a data processing flow performed by the shredding control unit 915 of the archive device 3B. In the shredding control unit 915, a shredding request received from the client device 2, and the like is processed.

First, the shredding control unit 915 determines whether a shredding request has been received from the client device 2, or the like (S4001). If it is not (S4001, No), the shredding control unit 915 stands by to receive a shredding request.

If it is determined that a shredding request has been received (S4001, Yes), the shredding control unit 915 refers to the inode management table 1012 of the file system 913 held by the archive device 3B to which the shredding control unit 915 belongs, with regard to the files included in the received shredding request. Then the shredding control unit 915 acquires old and new metadata recorded (the storing block address when the file had been stored in the file storage 3A, and block address currently stored in the archive device 3B) (S4002).

The shredding control unit 915 then transmits a shredding request to the file storage 3A via the communication network 5 (S4003). The shredding request includes a storing block address (old metadata) in the above-mentioned file storage 3A, with regard to the target file data for shredding.

The shredding control unit 915 then transmits a shredding request to the storage system 10 coupled to the archive device 3B to which the shredding control unit 915 belongs (S4004), and makes the shredding processing unit 512 perform shredding processing. The shredding request includes a storing block address (new metadata) in the archive device 3B, with regard to the target file data for shredding.

According to the above processing, the shredding control unit 915 of the archive device 3B can perform shredding processing even for the block address where the target file for the shredding request had been stored in the file storage 3A before its migration.

Information Processing System 1 According to Example 2 of Present Invention

Next, a description is given of an information processing system 1 according to a second Example of the present invention. Example 1 employs such a configuration that when a shredding request is accepted for each block address in the overlapped-stored state S3, and the overlapped-non-stored state S4, the shredding control unit 915 performs shredding processing on the block address, and subsequently, shredding is not performed (omitted) if a shredding request is made to the same block address.

As mentioned above, shredding has a high processing load which involves repeatedly overwriting fixed values or random number values on a specific data block. Thus, there is a problem that the throughput of the storage system 10 is decreased when many shredding requests are made intensively even if omission control of shredding processing of Example 1 is applied.

Now, instead of omitting shredding for specific block states, Example 2 employs a configuration in which shredding processing is performed dividedly multiple number of times depending on overlap storing times of data for a block address (i.e. the number of times recorded as the overlap times 9213 in the block state management table 921). Thus, even in the case where many shredding requests are made intensively, excessive processing load on the storage system 10 for shredding processing can be avoided by lowering required load for shredding at a time.

As a specific example of a case where shredding processing is divided and performed, for example, suppose that N is the number of data overwrite times to be performed for shredding processing, and M is a number of overlap times 9213 recorded associated with the target block address (M and N are integers not less than 1). In this case, the shredding processing may performed dividedly so that the number of data overwrite times for each divided shredding is given by the rounded-up integer of N/M.

In order to achieve the above-mentioned configuration, Example 2 is provided with a new state S5 in addition to the states S1 to S4 as the attributes for state management of block address in Example 1. FIG. 41 shows block state definitions of Example 2 corresponding to the block state definitions of Example 1 shown in FIG. 14. State S5 is referred to as a "shredding processing on-going state," and indicates that shredding processing for an associated block address is on-going and not completed yet.

Figure 42:
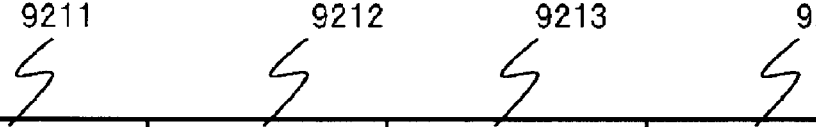
FIG. 42 is a setting example of the block status management table 921 of Example 2.

FIG. 42 shows a setting example of the block state management table 921 used in Example 2. In the case of Example 2, an item of percentage of completion 9214 is added to the block state management table 921 of Example 1 shown in FIG. 15. In the example of FIG. 42, the block address 5 (9211) is associated with the block state S5 (9212) and percentage of completion 20% (i.e. ⅕) (9214). In FIG. 42, the overlap times 9213 of the block address 5 is 5, which indicates that the above-mentioned number of data overwrite times is N, and the shredding processing is designed to be divided into 5 sub-processing and each sub-processing completes 20% of the whole processing.

Figure 43:
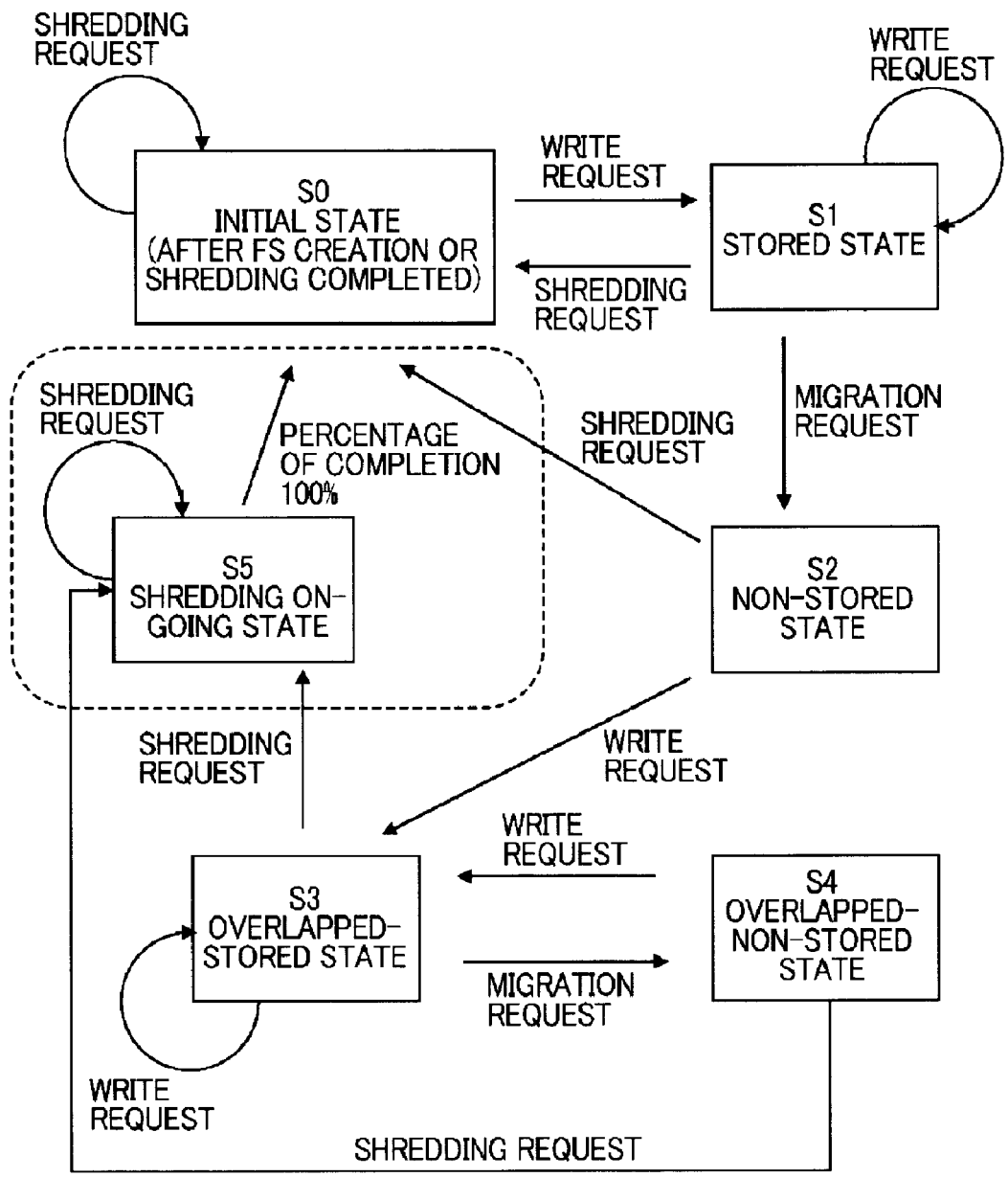
FIG. 43 is a schematic diagram explaining a block status transition in Example 2.

FIG. 43 shows a schematic diagram explaining block state transition in Example 2. FIG. 43 corresponds to FIG. 16 of Example 1, but differs from FIG. 16 in that FIG. 43 is provided with the state S5, which indicates that the shredding is on-going for a block address as shown with a broken line surrounding the state S5. FIGS. 44 and 45 each show a setting example of the block state transition table 922 in Example 2. FIG. 44 and FIG. 45 correspond to FIG. 17 and FIG. 27 of Example 1, respectively. As shown in FIGS. 44 and 45, the block state transition table 922 is provided with a "shredding processing on-going" state S5 in the before-transition state and after-transition state.

Different aspects of Example 2 from that of Example 1 related to block state transition are described below. When a shredding request is accepted for a block address in the overlapped-stored state S3, the overlapped-non-stored state S4, or the state S5 with non-zero percentage of completion 9214, the shredding control unit 915 performs the above-mentioned divided shredding processing, and the percentage of completion 9214 of the block state management table 921 is updated accordingly. That is, the percentage of completion 9214 is increased by a percentage of the divided shredding processing (e.g. ⅕).

Regarding the block address of the shredding processing on-going state S5, when a shredding request rendering the percentage of completion 100% is accepted, the shredding control unit 915 resets the overlap times 9213 and the percentage of completion 9214 to zero and makes a block state transition to S0 (the initial state) where the overlap times and the percentage of completion are recorded in association with the block state management table 921.

An Example of Data Processing Flow by Shredding Control Unit 915 of File Storage 3A in Example 2

Figure 46:
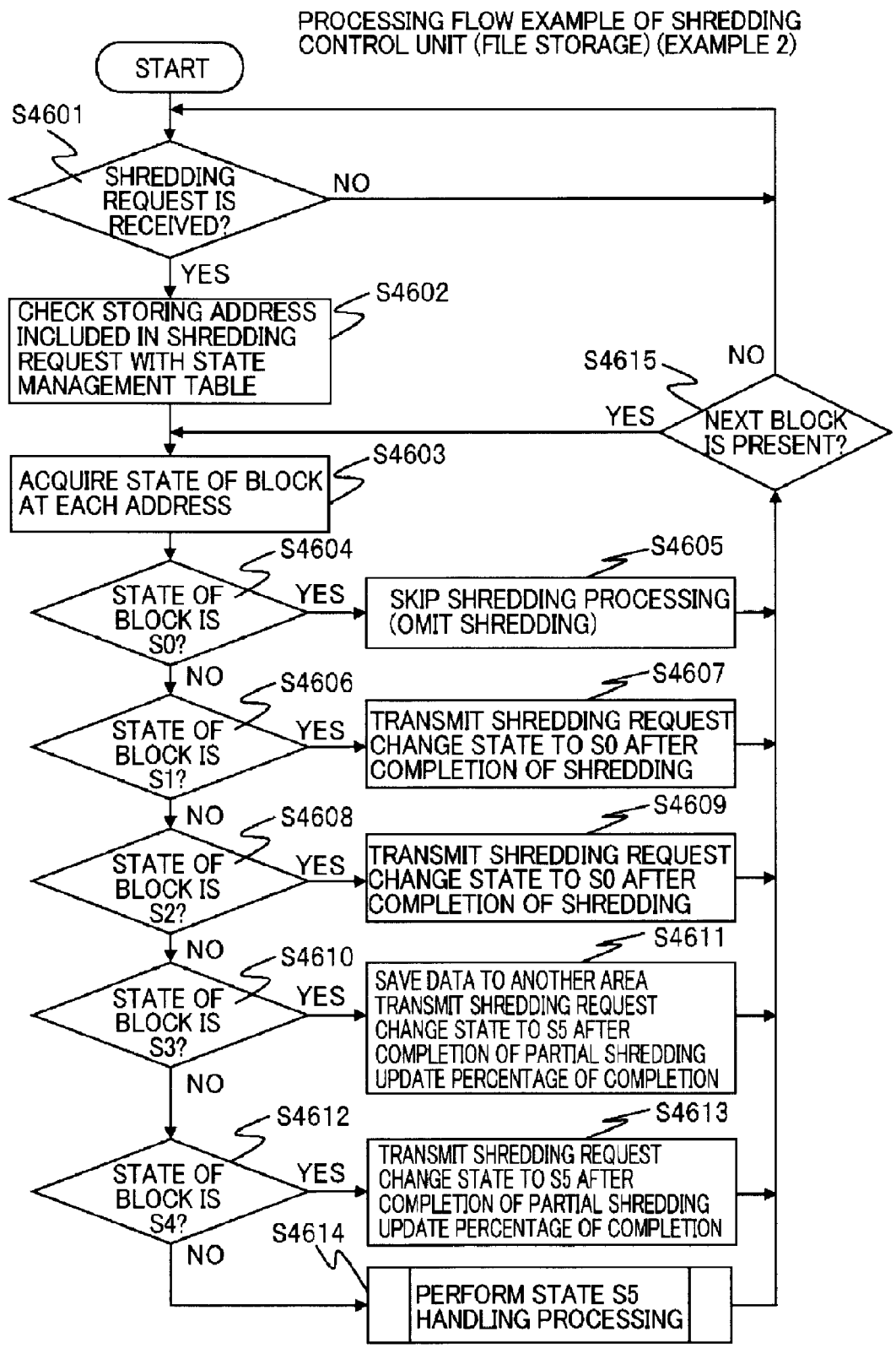
FIG. 46 is an example of processing flow of the shredding control unit 915 of Example 2 (the file storage 3A side).

FIG. 46 shows an example of a data processing flow performed by the shredding control unit 915 in the file storage 3A of Example 2. The basic configuration of the process flow of FIG. 46 corresponds to that of the processing flow of FIG. 39 with regard to Example 1, and only difference between the two configurations is that the former configuration can have the block state of the state S5. Hereinbelow, the difference is described for the sake of simplicity. First, in the case that the block state is determined to be in the state S3 in S4610 (S4610, Yes), the shredding control unit 915 transmits, to the shredding processing unit 512 of the storage system 10, the shredding request of the block address as well as a request to move in-use file data stored in the block address to unused storage area such as no data stored area. Upon receiving a shredding completion notification, the shredding control unit 915 changes the corresponding block state 9212 to the state S5 in the block state management table 921, and updates the corresponding percentage of completion 9214 (S4611).

In the case that the block state is determined to be in the state S4 in S4612 (S4612, Yes), the shredding control unit 915 transmits the shredding request of the block address to the shredding processing unit 512 of the storage system 10. Upon receiving a shredding completion notification, the shredding control unit 915 changes the corresponding block state 9212 to the state S5 in the block state management table 921, and updates the corresponding percentage of completion 9214 (S4613).

In the case that the block state 9212 of the block address is determined not to be in the state S4 in S4612 (S4612, No), the shredding control unit 915 determines that the block state 9212 of the block address determined in S4612 is in the state S5 (shredding on-going state), and makes the shredding processing unit 512 of the storage system 10 perform state S5 handling processing of S4614.

Figure 47:
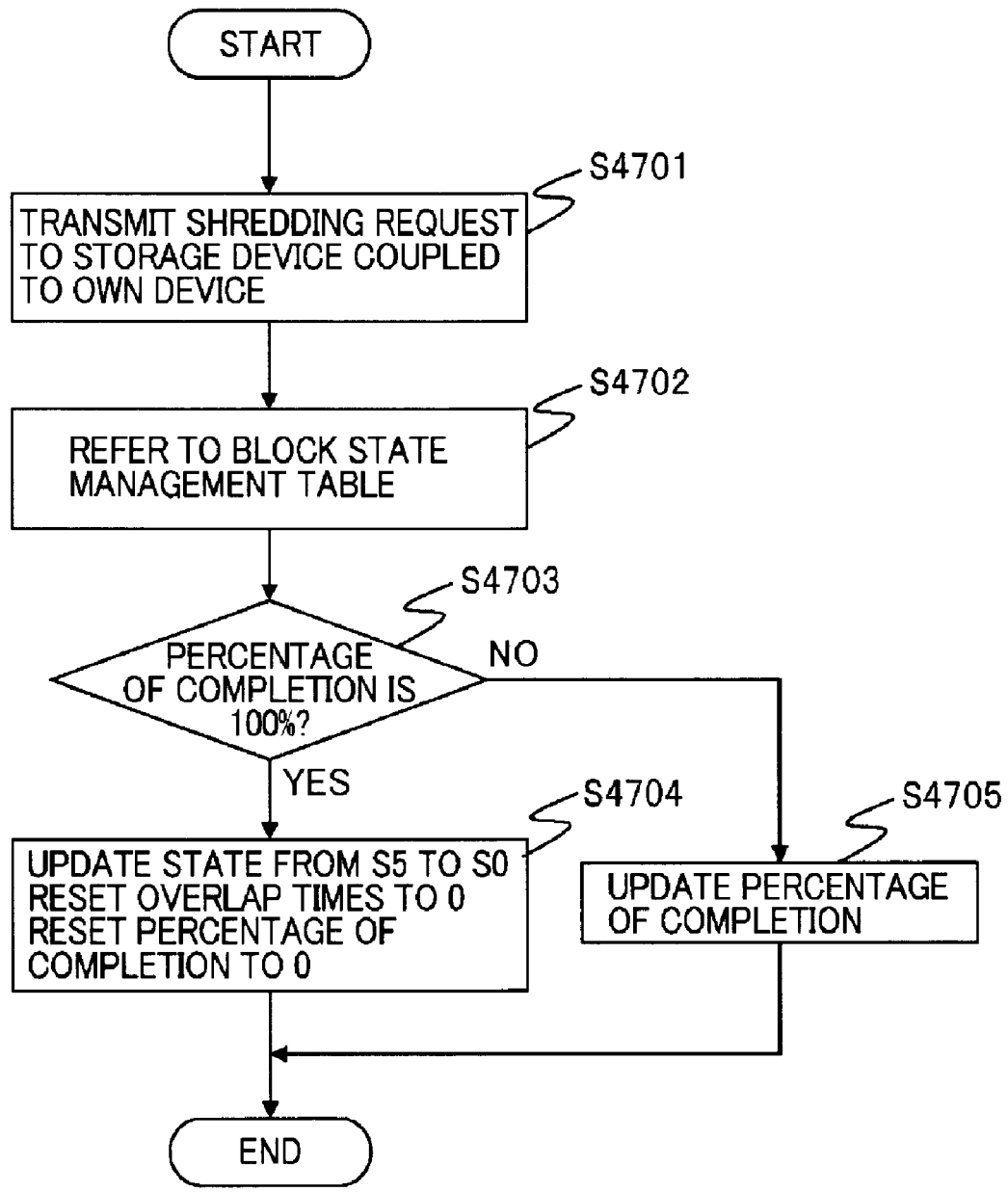
FIG. 47 is an example of processing flow of the shredding control unit 915 of Example 2 (the archive device 3B side).

FIG. 47 shows an example of a processing flow of state S5 handling processing (S4614) in FIG. 46. First, the shredding control unit 915 transmits a shredding request to the storage system 10 coupled to the file storage 3A to which the shredding control unit 915 belongs. Here, the shredding control unit 915 includes the information related to the number of overwrite times in the shredding request so that the information can be set according to the overlap times 9213.

The shredding control unit 915 then refers to the block state management table 921 (S4702) to determine whether the percentage of completion 9214 recorded therein is 100% (S4703). In the case that the percentage of completion 9214 is determined to be 100% (S4703, Yes), the shredding control unit 915 changes the block state 9212 for the block address from the state S5 to the state S0 in the block state management table 921, then resets the overlap times 9213 and the percentage of completion 9214 to zero (S4704), and returns to the processing flow of FIG. 46. In the case that the percentage of completion 9214 is determined not to be 100% (S4703, Yes) in S4703, the shredding control unit 915 updates the percentage of completion 9214 in part (for example, ⅕) (S4705), and returns to the processing flow of FIG. 46.

According to the above processing, the shredding control unit 915 of the file storage 3A divides shredding in parts and causes shredding for a block address where data is stored in the overlapped manner after migration to be performed dividedly according to the times of overlapped storing. Thus, even if many shredding requests are made intensively, inconvenience due to excessive processing load on the storage system 10 and decrease in I/O performance can be avoided By the information processing system 1 according to the Examples described above, shredding processing is performed securely for the block address of the data storage of migration origin so that advanced data security can be achieved. Furthermore, an excessive processing load on the storage device due to shredding processing can be avoided, thereby providing an effect of preventing decrease in I/O performance.

In the above, the embodiments have been described; however, the above-mentioned embodiments are intended to facilitate understanding of the present invention and not to be taken in a limiting sense. The present invention may be modified or improved without departing from the spirit of the invention, and the present invention also includes the equivalents thereof.

The invention claimed is:

1. An information processing device that receives a data input/output request in a unit of a file, and performs writing and reading of data to and from a storage device having a recording medium in which a file entity specified in the received data input/output request is stored in units of data blocks, the information processing device being communicatively coupled to a different storage device which is a migration destination of data included in a certain file stored in the recording medium, the information processing device comprising:
   a processing unit,
   wherein when the data included in the certain file is migrated to the different storage device, and other data included in a different file is then stored in an overlapped manner in the data blocks previously storing the migrated data, and when the information processing device receives a shredding request from the different storage device to shred the data blocks storing the different file, the processing unit determines whether the data blocks storing the different file contain a data block previously storing the data of the certain file and already shredded, and skips shredding of the data block determined as already shredded.

2. The information processing device according to claim 1, wherein when the data included in the certain file is migrated to the different storage device, and other data included in a different file is then stored in an overlapped manner in the data blocks previously storing the migrated data, the information processing device stores therein overlapped storing information which indicates that the other data included in the different file is written in each of the data blocks in the overlapped manner after migration of the data included in the certain file, in association with the data block in which the other data included in the different file is stored in the overlapped manner, and invalidates the overlapped storing information when the data block associated with the overlapped storing information is shredded, and the information processing device further stores therein information indicating that the data stored in the data block associated with the overlapped storing information is in use,
   wherein when receiving a shredding request to shred a data block storing data associated with the information indicating that the data is in use, the information processing device moves the data to a different available data block and then shreds the data block, the overlapped storing information contains overlap times indicating the number of times of overlapped storing which is incremented each time the other data included in the different file is stored in the overlapped manner, the shredding is a process to overwrite predetermined data on a data block to be shredded a predetermined number of times,
   wherein when receiving a shredding request to shred a data block in which the other data included in the different file is stored in the overlapped manner, the information processing device divides the shredding by a quotient value obtained from dividing the number of times of overwriting the predetermined data by the stored overlap times, and performs the divided shredding, the information processing device stores a directory entry in which a correspondence between a file path name and an inode number is managed, and an inode management table in which a correspondence between an inode number and a data block is managed,
   wherein when receiving the shredding request, the information processing device acquires from the directory entry the inode number corresponding to the file path name specified in the request, then acquires the data block corresponding to the acquired inode number from the inode management table, and shreds the acquired data block, and
   wherein when migrating the data included in the certain file to the different storage device, the information processing device transmits the data to be migrated and block address information indicating an address of the data block previously storing the data to the different storage device.

3. The information processing device according to claim 1, wherein when the data included in the certain file is migrated to the different storage device, and other data included in a different file is then stored in the overlapped manner in the data blocks previously storing the migrated data, the information processing device stores therein overlapped storing information which indicates that the other data included in the different file is written in each of the data blocks in the overlapped manner after migration of the data included in the certain file, in association with the data block in which the other data included in the different file is stored in the overlapped manner, and invalidates the overlapped storing information when the data block associated with the overlapped storing information is shredded.

4. The information processing device according to claim 3, wherein the information processing device further stores therein information indicating that the data stored in the data block associated with the overlapped storing information is in use, and when receiving a shredding request to shred a data block storing data associated with the information indicating that the data is in use, the information processing device moves the data to a different available data block and then shreds the data block.

5. The information processing device according to claim 3, wherein the overlapped storing information contains overlap times indicating the number of overlapped storing which is incremented each time the other data included in the different file is stored in the overlapped manner.

6. The information processing device according to claim 5, wherein the shredding is a process to overwrite predetermined data on a data block to be shredded for a predetermined number of times, and when receiving a shredding request to shred a data block in which the other data included in the different file is stored in the overlapped manner, the information processing device divides the shredding by a quotient value obtained from dividing the number of times of overwriting the predetermined data by the stored overlap times, and performs the divided shredding.

7. The information processing device according to claim 1, wherein the information processing device stores a directory entry in which a correspondence between a file path name and an inode number is managed, and an inode management table in which a correspondence between an inode number and a data block is managed, and when receiving the shredding request, the information processing device acquires from the directory entry the inode number corresponding to a file path name specified in the request, then acquires the data block corresponding to the acquired inode number from the inode management table, and shreds the acquired data block.

8. The information processing device according to claim 1, wherein when migrating the data included in the certain file to the different storage device, the information processing device transmits the data to be migrated and block address information indicating an address of the data block previously storing the data to the different storage device.

9. A method of shredding data in an information processing device that receives a data input/output request in a unit of a file, and performs writing and reading of data to and from a storage device having a recording medium in which a file entity specified in the received data input/output request is stored in units of data blocks, the information processing device being communicatively coupled to a different storage device which is a migration destination of data included in a certain file stored in the recording medium, the information processing device including a processing unit, the method comprising:

when the data included in the certain file is migrated to the different storage device, and other data included in a different file is then stored in an overlapped manner in the data blocks previously storing the migrated data, and when the information processing device receives a shredding request from the different storage device to shred the data blocks storing the different file, determining, by the processing unit, whether the data blocks storing the different file contain a data block previously storing the data of the certain file and already shredded, and skipping, by the processing unit, shredding of the data block determined as already shredded.

10. The method of shredding data according to claim 9, further comprising:

when the data included in the certain file is migrated to the different storage device, and other data included in a different file is then stored in the overlapped manner in the data blocks previously storing the migrated data, storing, in the information processing device, overlapped storing information which indicates that the other data included in the different file is written in each of the data blocks in the overlapped manner after migration of the data included in the certain file, in association with the data block in which the other data included in the different file is stored in the overlapped manner; and invalidating, by the information processing device, the overlapped storing information when the data block associated with the overlapped storing information is shredded.

11. The method of shredding data according to claim 10, further comprising:

storing, in the information processing device, information indicating that the data stored in the data block associated with the overlapped storing information is in use; and when receiving a shredding request to shred a data block storing data associated with the information indicating that the data is in use, moving, by the information processing device, the data to a different available data block, and then shredding, by the information processing device, the data block.

12. The method of shredding data according to claim 10, wherein the overlapped storing information contains an overlap times indicating the number of overlapped storing which is incremented each time the other data included in the different file is stored in the overlapped manner.

13. The method of shredding data according to claim 12, wherein the shredding is a process to overwrite predetermined data on a data block to be shredded for a predetermined number of times, and when receiving a shredding request to shred a data block in which the other data included in the different file is stored in the overlapped manner, the information processing device divides the shredding by a quotient value obtained from dividing the number of times of overwriting the predetermined data by the stored overlap times, and performs the divided shredding.

14. The method of shredding data according to claim 9, further comprising:

storing, by the information processing device, a directory entry in which a correspondence between a file path name and an inode number is managed, and an inode management table in which a correspondence between an inode number and a data block is managed; and when receiving the shredding request, acquiring, by the information processing device, from the directory entry the inode number corresponding to a file path name specified in the request, then acquiring, by the information processing device, the data block corresponding to the acquired inode number from the inode management table, and shredding, by the information processing device, the acquired data block.

15. The method of shredding data according to claim 9, wherein when migrating the data included in the certain file to the different storage device, transmitting, by the information processing device, the data to be migrated and block address information indicating an address of the data block previously storing the data to the different storage device.

* * * * *